(12) United States Patent
Watanabe et al.

(10) Patent No.: US 6,346,594 B1
(45) Date of Patent: Feb. 12, 2002

(54) OCULAR LENS MATERIAL AND PROCESS FOR PRODUCING SAME

(75) Inventors: Tsuyoshi Watanabe; Masaki Baba, both of Kasugai (JP)

(73) Assignee: Menicon Co., Ltd., Nagoya (JP)

( * ) Notice: Subject to any disclaimer, the term of this patent is extended or adjusted under 35 U.S.C. 154(b) by 0 days.

(21) Appl. No.: 09/397,674

(22) Filed: Sep. 16, 1999

(30) Foreign Application Priority Data

Sep. 21, 1998 (JP) .......................................... 10-266561

(51) Int. Cl.[7] ............................................... C08G 77/26
(52) U.S. Cl. .............................. 528/26; 528/27; 528/28; 526/279; 351/160 H
(58) Field of Search .................. 351/160 H; 528/26, 528/28, 27; 526/279

(56) References Cited

U.S. PATENT DOCUMENTS

| | | |
|---|---|---|
| 4,523,002 A | 6/1985 | Campbell et al. |
| 5,091,493 A | 2/1992 | O'Lenick, Jr. et al. |
| 5,311,223 A * | 5/1994 | Vanderlaan ............. 351/160 H |
| 5,783,650 A * | 7/1998 | Bowers et al. ............. 526/277 |
| 5,936,703 A | 8/1999 | Miyazaki et al. |

FOREIGN PATENT DOCUMENTS

| | | | |
|---|---|---|---|
| EP | 0 818 479 A2 | | 1/1998 |
| JP | 09296019 | | 11/1997 |
| WO | 94/16748 | * | 4/1994 |

* cited by examiner

Primary Examiner—Margaret G. Moore

(74) Attorney, Agent, or Firm—Armstrong, Westerman, Hattori, McLeland & Naughton, LLP

(57) ABSTRACT

An ocular lens material comprising a silicone compound having a zwitterionic group (I) represented by the formula (I):

(I)

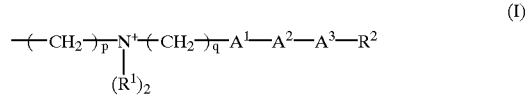

wherein $R^1$ is H or an alkyl, $R^2$ is an aliphatic hydrocarbon or an aromatic hydrocarbon, $A^1$ is O, S, NH or direct bond, $A^2$ is POO$^-$ or SOO$^-$, $A^3$ is O, S, NH or =O, in which when $A^2$ is SOO$^-$, $A^1$ and $A^3$ are not S, and when $A^3$ is =O, $R^2$ is absent, each of p and q is 1 to 20; a zwitterionic group (II) represented by the formula (II):

(II)

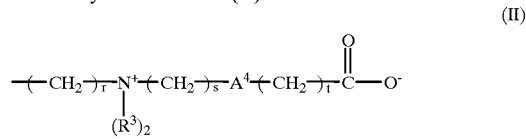

wherein $R^3$ is H or an alkyl, $A^4$ is O, S, NH or direct bond, each of r, s and t is 1 to 20; or a zwitterionic group (III) represented by the formula (III):

(III)

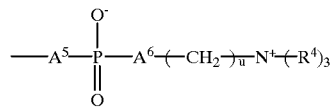

wherein $R^4$ is H or an alkyl, each of $A^5$ and $A^6$ is O, S, NH or direct bond, in which $A^5$ and $A^6$ are not direct bonds at the same time, u is 1 to 20, and a process for producing the same. The ocular lens material shows excellent transparency, oxygen permeability, deposit resistance and wettability to tears at the same time.

12 Claims, No Drawings

OCULAR LENS MATERIAL AND PROCESS FOR PRODUCING SAME

BACKGROUND OF THE INVENTION

The present invention relates to an ocular lens material and a process for producing the same. More particularly, the present invention relates to an ocular lens material which shows, of course, excellent transparency, and which-as high oxygen permeability and is also excellent in deposit resistance and wettability to tears at the same time, and a process for easily producing the ocular lens material.

In recent years, as to optical materials, in particular, contact lens materials, it is thought that one of the causes of various ocular diseases is lowering of hydrophilic property (wettability to tears) of the lens surface or adhering of deposit such as protein or lipid. So, to highten hydrophilic property and deposit resistance is watched.

Conventionally, as a contact lens material showing water-absorptive property and excellent oxygen permeability, a material comprising a copolymer prepared by polymerizing a hydrophilic monomer such as 2-hydroxyethyl methacrylate or N,N-dimethylacrylamide with a fluorine-containing (meth)acrylate or a silicon-containing (meth)acrylate has been proposed in Japanese Unexamined Patent Publication No.121826/1994.

However, it is previously known that protein or lipid is accumulated on the matrix or to the inside of the above material comprising such copolymer.

On the other hand, hydrogel having high transparency and showing high preventing effect for adhesion of protein, comprising a copolymer prepared by introducing a zwitterionic group into a matrix made from a hydrophilic monomer such as 2-hydroxyethyl methacrylate has been proposed in Japanese Unexamined Patent Publication No.20814/1997.

However, oxygen permeability of the above hydrogel depends upon water content, so that its oxygen permeability never becomes higher than oxygen permeability of water.

As a rigid gas permeable contact lens material showing excellent oxygen permeability and non-water-absorptive property, a material comprising a copolymer prepared by polymerizing a fluorine-containing (meth)acrylate, a silicon-containing (meth)acrylate or a silicon-containing styrene derivative has been proposed in Japanese Examined Patent Publication No.55122/1987 and Japanese Patent No.2515010.

However, it is previously known that the above hard and high oxygen permeable material is poor in water retention on the surface thereof, and as a result, a patient uncomfort such as dry feeling in eyes is generated during wearing of lenses.

Then, it can be considered that a material showing excellent oxygen permeability and preventing effect for adhesion of lipid or protein can be produced from a copolymer prepared by polymerizing a zwitterionic group-containing monomer which can be expected to show high deposit resistance with a fluorine-containing (meth)acrylate or a silicon-containing (meth)acrylate, or a copolymer prepared by polymerizing a fluorine-containing (meth)acrylate into which a zwitterionic group is introduced or a silicon-containing (meth)acrylate into which a zwitterionic group is introduced.

However, the above zwitterionic group-containing monomer (intramolecular salt: betaine) is generally solid and extremely poor in solubility with not only various hydrophilic monomers but also, in particular, hydrophobic monomers. As a result, it is difficult that a transparent copolymer is prepared. In particular, the zwitterionic group-containing monomer cannot show solubility with a silicon-containing compound which is an essential component for an oxygen permeable material. Transparency is very important property for an optical material such as an ocular lens material. So, improvement of this solubility is important problem.

As a method for preparing a homogeneous copolymer by copolymerizing one monomer with the other monomer showing extremely poor solubility with the former monomer, such as 2-hydroxyethyl methacrylate with a silicon-containing (meth)acrylate, a method for improving solubility of monomers with each other by using a diluent such as an organic solvent is proposed in International Publication No.WO97/09169.

However, as mentioned above, the zwitterionic group-containing monomer (intramolecular salt: betaine) is extremely poor in solubility with the organic solvent in addition to the hydrophobic monomer. For instance, the zwitterionic group-containing monomer shows solubility with only water, methanol and the like. On the other hand, a fluorine-containing (meth)acrylate and a silicon-containing (meth)acrylate cannot show solubility with water. When methanol or ethanol is used as a diluent, even if a monomer mixture solution is homogeneous and transparent, only opaque and phase-separated copolymers are prepared owing to volatilization of the diluent during polymerization.

A method for preparing a polymer film by casting a polymer solution of a siloxane-phosphorylcholine block copolymer which is a zwitterionic group-containing copolymer prepared by solution polymerization is proposed in Japanese Unexamined Patent Publication No.296019/1997.

However, the zwitterionic group-containing copolymer has a defect that it shows difficulty for dissolving in a solvent suitable for cast-coating owing to pseudo-crosslinking by positive and negative charge of a zwitterion. By this method, also, it is very difficult that a quite transparent copolymer is prepared.

An object of the present invention is to provide an ocular lens material which shows, of course, excellent transparency, and which has high oxygen permeability and also shows excellent deposit resistance such as preventing effect for adhesion of lipid or protein and excellent wettability to tears at the same time.

Another object of the present invention is to provide a process for easily producing the above ocular lens material which shows various excellent properties at the same time.

These and other objects of the present invention will become apparent from the description hereinafter.

SUMMARY OF THE INVENTION

In accordance with the present invention, there are provided an ocular lens material comprising a silicone compound having a zwitterionic group (I) represented by the formula (I):

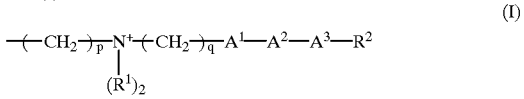

(I)

wherein $R^1$ is hydrogen atom or a linear or branched alkyl group having 1 to 10 carbon atoms, in which two groups represented by $R^1$ may be the same or different with each other, $R^2$ is a linear or branched aliphatic hydrocarbon group having 1 to 12 carbon atoms or an aromatic hydrocarbon group, $A^1$ is —O—, —S—, —NH— or direct bond, $A^2$ is

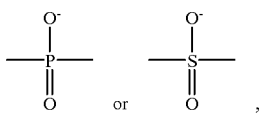

$A^3$ is —O—, —S—, —NH— or =O, in which when $A^2$ is —SOO—, $A^1$ and $A^3$ are not —S—, and when $A^3$ is =O, $R^2$ is absent, and each of p and q is independently an integer of 1 to 20; a zwitterionic group (II) represented by the formula (II):

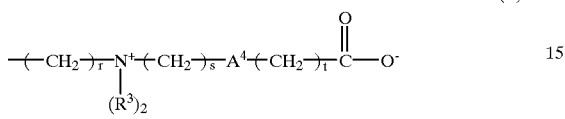 (II)

wherein $R^3$ is hydrogen atom or a linear or branched alkyl group having 1 to 10 carbon atoms, in which two groups represented by $R^3$ may be the same or different with each other, $A^4$ is —O—, —S—, —NH— or direct bond, and each of r, s and t is independently an integer of 1 to 20; or a zwitterionic group (III) represented by the formula (III):

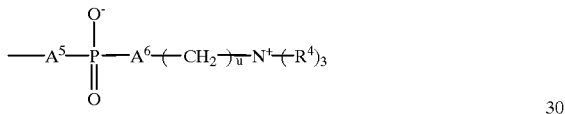 (III)

wherein $R^4$ is hydrogen atom or a linear or branched alkyl group having 1 to 10 carbon atoms, in which three groups represented by $R^4$ may be the same or different with each other, each of $A^5$ and $A^6$ is independently —O—, —S—, —NH— or direct bond, in which $A^5$ and $A^6$ are not direct bonds at the same time, and u is an integer of 1 to 20;

a process for producing an ocular lens material (hereinafter referred to as process (I)) comprising a silicone compound, characterized by preparing a prepolymer of the silicone compound by copolymerizing a monomer mixture containing a monomer (A-1) having a group represented by the formula (IV):

 (IV)

wherein $R^6$ is an alkylene group having 1 to 20 carbon atoms, and $R^7$ is a linear or branched alkyl group having 1 to 10 carbon atoms and a silicon-containing monomer, and reacting the prepolymer of the silicone compound with a compound (B-1) which can react with the monomer (A-1) and impart —POO⁻, —SOO⁻ or —COO⁻ to a silicone compound, to give the silicone compound having a zwitterionic group (I) represented by the formula (I):

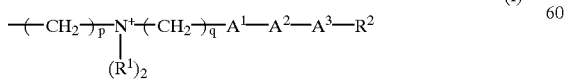 (I)

wherein $R^1$ is hydrogen atom or a linear or branched alkyl group having 1 to 10 carbon atoms, in which two groups represented by $R^1$ may be the same or different with each other, $R^2$ is a linear or branched aliphatic hydrocarbon group having 1 to 12 carbon atoms or an aromatic hydrocarbon group, $A^1$ is —O—, —S—, —NH— or direct bond, $A^2$ is

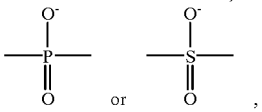

$A^3$ is —O—, —S—, —NH— or =O, in which when $A^2$ is —SOO—, $A^1$ and $A^3$ are not —S—, and when $A^3$ is =O, $R^2$ is absent, and each of p and q is independently an integer of 1 to 20; or a zwitterionic group (II) represented by the formula (II):

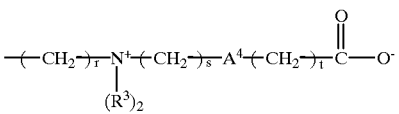 (II)

wherein $R^3$ is hydrogen atom or a linear or branched alkyl group having 1 to 10 carbon atoms, in which two groups represented by $R^3$ may be the same or different with each other, $A^4$ is —O—, —S—, —NH— or direct bond, and each of r, s and t is independently an integer of 1 to 20; and a process for producing an ocular lens material (hereinafter referred to as process (II)) comprising a silicone compound, characterized by preparing a prepolymer of the silicone compound by copolymerizing a monomer mixture containing a hydroxyl group-containing monomer (A-2) and a silicon-containing monomer, preparing a prepolymer (B') by reacting the prepolymer of the silicone compound with a halogenated cyclic compound having phosphorus atom (B-2), and reacting the prepolymer (B') with a trialkylamine (C-1) represented by the formula (VII):

 (VII)

wherein $R^4$ is hydrogen atom or a linear or branched alkyl group having 1 to 10 carbon atoms, in which three groups represented by $R^4$ may be the same or different with each other, to give the silicone compound having a zwitterionic group (III) represented by the formula (III):

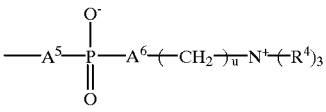 (III)

wherein $R^4$ is hydrogen atom or a linear or branched alkyl group having 1 to 10 carbon atoms, in which three groups represented by $R^4$ may be the same or different with each other, each of $A^5$ and $A^6$ is independently —O—, —S—, —NH— or direct bond, in which $A^5$ and $A^6$ are not direct bonds at the same time, and u is an integer of 1 to 20.

The ocular lens material of the present invention comprises the silicone compound having the specific zwitterionic group (I), (II) or (III). Accordingly, the ocular lens material of the present invention shows, of course, excellent transparency, and which has high oxygen permeability without depending on water content and also shows excellent deposit resistance and excellent wettability to tears at the same time.

In accordance with the process of the present invention, the ocular lens material which shows the above various excellent properties at the same time can be easily produced.

DETAILED DESCRIPTION

Us The ocular lens material of the present invention comprises the specific silicone compound. The silicone compound has a zwitterionic group (I) represented by the formula (I):

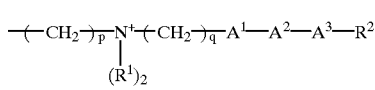

wherein $R^1$, $R^2$, $A^1$, $A^2$, $A^3$, p and q are the same as the above, respectively; a zwitterionic group (II) represented by the formula (II):

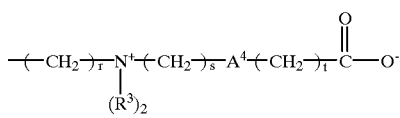

wherein $R^3$, $A^4$, r, s and t are the same as the above, respectively; or a zwitterionic group (III) represented by the formula (III):

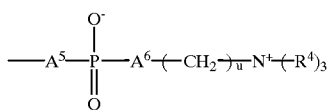

wherein $R^4$, $A^5$, $A^6$ and u are the same as the above, respectively.

In the present invention, the above silicone compound is prepared in accordance with not copolymerization of zwitterionic group-containing monomers but the above specific processes. In accordance with the process (I), a polymer matrix (prepolymer) which is excellent in oxygen permeability and can impart —$N^+$ to the silicone compound is previously prepared and then, —$POO^-$, —$SOO^-$ or —$COO^-$ is introduced into the polymer matrix by polymer reaction to give the silicone compound having the zwitterionic group (I) or the zwitterionic group (II). On the other hand, in accordance with the process (II), a polymer matrix (prepolymer) which is excellent in oxygen permeability is previously prepared, —$POO^-$ is introduced into the polymer matrix by polymer reaction, and further —$N_+$ is introduced into the polymer matrix by polymer reaction to give the silicone compound having the zwitterionic group (III). That is, for instance, a silicon-containing monomer, a hydrophilic monomer, a monomer having a functional group capable of reacting with a compound which can constitute the zwitterionic group later and the like are firstly copolymerized with each other to give a transparent polymer matrix showing excellent oxygen permeability. Then, the polymer matrix is reacted with the compound which can finally constitute the zwitterionic group in an organic solvent or directly to give a compound comprising a matrix into which the zwitterionic group is introduced.

Because the above specific process (I) or (II) is employed, differently from conventional processes, there are no problems such that solubility of monomers with each other is poor and solubility of a monomer with a solvent is poor. As a result, the silicone compound used in the present invention can show extremely excellent transparency. In addition, the silicone compound has high oxygen permeability and also shows excellent deposit resistance and excellent wettability to tears at the same time.

The above silicone compound may be in the state of xerogel not containing water, and may be in the state of hydrogel containing water, which is previously hydrated by immersing in saline.

The zwitterionic group contained in the above silicone compound is zwitterionic and has not only the center of permanent positive charge but also the center of negative charge. The center of permanent positive charge is imparted to the zwitterionic group from quaternary nitrogen atom. In the zwitterionic group, ammonium is contained as a cation, and phosphate, sulfonate or carboxylate is contained as an anion.

The process (I) of the present invention is explained below.

In accordance with the process (I) of the present invention, at first, a prepolymer of the silicone compound is prepared by copolymerizing a monomer mixture containing a monomer (A-1) having a group represented by the formula (IV):

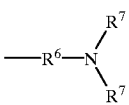

wherein $R^6$ and $R^7$ are the same as the above, respectively, and a silicon-containing monomer.

The group which is contained in the above monomer (A-1) and represented by the formula (IV) constitutes cationic parts of the zwitterionic group (I) or (II) in the silicone compound. The monomer (A-1) can be reacted with a compound (B-1) which can constitute the zwitterionic group (I) or (II) mentioned below and can impart —$POO^-$, —$SOO^-$ or —$COO^-$ to the silicone compound.

Typical examples of the monomer (A-1) are, for instance, a dialkylaminoalkyl (meth)acrylate represented by the formula:

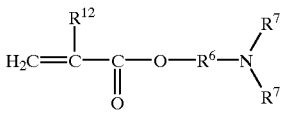

wherein $R^6$ and $R^7$ are the same as the above and $R^{12}$ is hydrogen atom or methyl group, such as N,N-dimethylaminomethyl (meth)acrylate, N,N-dimethylaminoethyl (meth)acrylate, N,N-dimethylaminopropyl meth)acrylate, N,N-dimethylaminobutyl (meth)acrylate, N,N-diethylaminomethyl (meth)acrylate, N,N-diethylaminoethyl (meth)acrylate, N,N-diethylaminopropyl (meth)acrylate or N,N-diethylaminobutyl (meth)acrylate, and the like. These can be used alone or in admixture thereof.

In the present specification, "—(meth)acrylate" means "—acrylate and/or methacrylate", and the same is also true for the other (meth)acrylate derivatives.

It is desired that the amount of the monomer (A-1) based on the total amount of the monomer mixture is at least 0.5% by weight, preferably at least 2% by weight, in order to sufficiently carry out a reaction between the monomer and the compound (B-1) which can finally constitute the zwitterionic group to impart excellent deposit resistance and wettability to tears to the ocular lens material. Also, in order to restrain lowering of flexibility and mechanical strength of the ocular lens material, it is desired that the amount of the monomer (A-1) based on the total amount of the monomer mixture is at most 50% by weight, preferably at most 40% by weight.

There is no limitation to a silicon-containing monomer in particular, and there can be used a silicon-containing alkyl (meth)acrylate, a silicon-containing styrene derivative and the like.

Examples of the above silicon-containing alkyl (meth) acrylate are, for example, trimethylsiloxydimethylsilylmethyl (meth)acrylate, trimethylsiloxydimethylsilylpropyl (meth)acrylate, methylbis(trimethylsiloxy)silylpropyl (meth)acrylate, tris(trimethylsiloxy)silylpropyl (meth)acrylate, mono[methylbis(trimethylsiloxy)siloxy]bis (trimethylsiloxy)silylpropyl (meth)acrylate, tris[methylbis (trimethylsiloxy)siloxy]silylpropyl (meth)acrylate, methylbis(trimethylsiloxy)silylpropylglyceryl (meth)acrylate, tris(trimethylsiloxy)silylpropylglyceryl (meth)acrylate, mono[methylbis(trimethylsiloxy)siloxybis (trimethylsiloxy)silylpropylglyceryl (meth)acrylate, trimethylsilylethyltetramethyldisiloxypropylglyceryl (meth) acrylate, trimethylsilylmethyl (meth)acrylate, trimethylsilylpropyl (meth)acrylate, trimethylsilylpropylglyceryl (meth)acrylate, trimethylsiloxydimethylsilylpropylglyceryl (meth)acrylate, methylbis(trimethylsiloxy) silylethyltetramethyldisiloxymethyl (meth)acrylate, tetramethyltriisopropylcyclotetrasiloxanylpropyl (meth) acrylate, tetramethyltriisopropylcyclotetrasiloxybis (trimethylsiloxy)silylpropyl (meth)acrylate and the like. These can be used alone or in admixture thereof.

Examples of the above silicon-containing styrene derivative are, for example, a styrene derivative represented by the formula (IX):

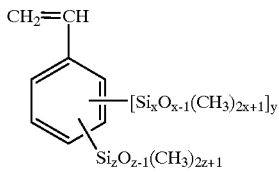

wherein x is an integer of 1 to 15, y is 0 or 1 and z is an integer of 1 to 15, and the like. As to the styrene derivative represented by the formula (IX), when x or z is an integer of at least 16, there are tendencies that it is difficult to synthesize and purify the derivative and that hardness of an ocular lens material is lowered. When y is an integer of at least 2, there is a tendency that it is difficult to synthesize the styrene derivative.

Typical examples of the styrene derivative represented by the formula (IX) are, for example, tris(trimethylsiloxy) silylstyrene,
bis(trimethylsiloxy)methylsilylstyrene,
(trimethylsiloxy) dimethylsilylstyrene,
tris(trimethylsiloxy)siloxydimethylsilylstyrene,
[bis(trimethylsiloxy)methylsiloxy]dimethylsilylstyrene,
(trimethylsiloxy)dimethylsilylstyrene,
heptamethyltrisiloxanylstyrene,
nonamethyltetrasiloxanylstyrene,
pentadecamethylheptasiloxanylstyrene,
heneicosamethyldecasiloxanylstyrene,
heptacosamethyltridecasiloxanylstyrene,
hentriacontamethylpentadecasiloxanylstyrene,
trimethylsiloxypentamethyldisiloxymethylsilylstyrene,
tris(pentamethyldisiloxy)silylstyrene,
tris(trimethylsiloxy)siloxybis(trimethylsiloxy) silylstyrene,
bis(heptamethyltrisiloxy)methylsilylstyrene,
tris[methylbis(trimethylsiloxy)siloxy]silylstyrene,
trimethylsiloxybis[tris(trimethylsiloxy)siloxy] silylstylene,
heptakis(trimethylsiloxy)trisilylstyrene,
nonamethyltetrasiloxyundecylmethylpentasiloxymethyl-silylstyrene,
tris[tris(trimethylsiloxy)siloxy]silylstyrene,
(tristrimethylsiloxyhexamethyl)tetrasiloxy-[tris (trimethylsiloxy)siloxy]trimethylsiloxysilylstyrene,
nonakis(trimethylsiloxy)tetrasilylstyrene,
bis(tridecamethylhexasiloxy)methylsilylstyrene,
heptamethylcyclotetrasiloxanylstyrene,
heptamethylcyclotetrasiloxybis(trimethylsiloxy) silylstyrene,
tripropyltetramethylcyclotetrasiloxanylstyrene, trimethylsilylstyrene and the like. These can be used alone or in admixture thereof.

It is desired that the amount of the silicon-containing monomer based on the total amount of the monomer mixture is at least 1% by weight, preferably at least 5% by weight in order to sufficiently improve oxygen permeability of the ocular lens material. Also, in order not to make it hard to obtain the ocular lens material of the present invention because the amount of the above silicon-containing monomer becomes too much and the amount of the monomer (A-1) becomes relatively little, it is desired that the amount of the silicon-containing monomer based on the total amount of the monomer mixture is at most 90% by weight, preferably at most 80% by weight.

In the process (I) of the present invention, as a monomer mixture for preparing the prepolymer, other than the above monomer (A-1) and the silicon-containing monomer, there can be used a monomer which is copolymerizable with these monomers, having an unsaturated double bond (hereinafter referred to as other monomer).

For instance, when it is desired that lipid-deposit resistance is imparted to an ocular lens material, as an other monomer, there can be used, for example, a fluorine-containing monomer represented by the formula (X):

$$CH_2=CR^{13}COOC_vH_{(2v-w+1)}F_w \qquad (X)$$

wherein $R^{13}$ is hydrogen atom or $CH_3$, v is an integer of 1 to 15, and w is an integer of 1 to $(2v+1)$, and the like.

Typical examples of the fluorine-containing monomer are, for example, 2,2,2-trifluoroethyl (meth)acrylate, 2,2,3,3-tetrafluoropropyl (meth)acrylate, 2,2,3,3-tetrafluoro-t-pentyl (meth)acrylate, 2,2,3,4,4,4-hexafluorobutyl (meth)acrylate, 2,2,3,4,4,4-hexafluoro-t-hexyl (meth)acrylate, 2,3,4,5,5,5-hexafluoro-2,4-bis(trifluoromethyl)pentyl (meth)acrylate, 2,2,3,3,4,4-hexafluorobutyl (meth)acrylate, 2,2,2,2',2',2'-hexafluoroisopropyl (meth)acrylate, 2,2,3,3,4,4,4-heptafluorobutyl (meth)acrylate, 2,2,3,3,4,4,5,5-octafluoropentyl (meth)acrylate, 2,2,3,3,4,4,5,5,5-nonafluoropentyl (meth)acrylate, 2,2,3,3,4,4,5,5,6,6,7,7-dodecafluoroheptyl (meth)acrylate, 3,3,4,4,5,5,6,6,7,7,8,8-dodecafluorooctyl (meth)acrylate, 3,3,4,4,5,5,6,6,7,7,8,8,8- tridecafluorooctyl (meth)acrylate, 2,2,3,3,4,4,5,5,6,6,7,7,7-tridecafluoroheptyl (meth)acrylate, 3,3,4,4,5,5,6,6,7,7,8,8,9,9,10,10-hexadecafluorodecyl (meth)acrylate, 3,3,4,4,5,5,6,6,7,7,8,8,9,9,10,10,10-heptadecafluorodecyl (meth)acrylate, 3,3,4,4,5,5,6,6,7,7,8,8,9,9,10,10,11,11-octadecafluoroundecyl (meth)acrylate, 3,3,4,4,5,5,6,6,7,7,8,8,9,9,10,10,11,11,11-nonadecafluoroundecyl (meth)acrylate, 3,3,4,4,5,5,6,6,7,7,8,8,9,9,10,10,11,11,12,12-eicosafluorododecyl (meth)acrylate and the like. These monomers can be used alone or in admixture thereof.

When it is desired that hardness of an ocular lens material is adjusted and the ocular lens material is made to be hard, soft or flexible, as an other monomer, there can be used, for example, a linear, branched or cyclic alkyl (meth)acrylate such as methyl (meth)acrylate, ethyl (meth)acrylate, isopropyl (meth)acrylate, n-propyl (meth)acrylate, isobutyl (meth)acrylate, n-butyl (meth)acrylate, t-butyl (meth)acrylate, 2-ethylhexyl (meth)acrylate, n-octyl (meth)acrylate, n-decyl (meth)acrylate, n-dodecyl (meth)acrylate, n-pentyl (meth)acrylate, t-pentyl (meth)acrylate, hexyl (meth)acrylate, heptyl (meth)acrylate, nonyl (meth)acrylate, stearyl (meth)acrylate, cyclopentyl (meth)acrylate or cyclohexyl (meth)acrylate; an alkoxyalkyl (meth)acrylate such as 2-ethoxyethyl (meth)acrylate, 3-ethoxypropyl (meth)acrylate, 2-methoxyethyl (meth)acrylate or 3-methoxypropyl (meth)acrylate; an 5 alkylthioalkyl (meth)acrylate such as ethylthioethyl (meth)acrylate or methylthioethyl (meth)acrylate; and the like. These monomers can be used alone or in admixture thereof.

When it is desired that water content of an ocular lens material is adjusted, as an other monomer, there can be used hydrophilic monomers such as a hydroxyalkyl (meth)acrylate such as 2-hydroxyethyl (meth)acrylate, hydroxybutyl (meth)acrylate or hydroxypropyl (meth)acrylate; an alkyl (meth)acrylamide such as N,N-dimethyl(meth)acrylamide, N,N-diethyl(meth)acrylamide, N-methyl(meth)acrylamide N-ethyl(meth)acrylamide or N-isopropyl(meth)acrylamide; a (poly) alkylene glycol mono(meth)acrylate such as ethylene glycol mono(meth)acrylate or propylene glycol mono (meth)acrylate; a lactam such as N-vinylpyrrolidone or N-vinylpiperidone; (meth)acrylic acid; maleic anhydride; maleic acid; fumaric acid; a fumaric acid derivative; aminostyrene; and hydroxystyrene. These monomers can be used alone or in admixture thereof.

Further, when it is desired to impart excellent deposit resistance, high oxygen permeability and high mechanical strength to an ocular lens material, as an other monomer, there can be used a polysiloxane macromonomer in which a polymerizable group bonds to a siloxane main chain through one or two urethane bond, represented by the formula (XI):

[wherein $A^7$ is a group represented by the formula (XII):

(in which $Y^{21}$ is acryloyloxy group, methacryloyloxy group, vinyl group or allyl group, and $R^{31}$ is a linear or branched alkylene group having 2 to 6 carbon atoms); $A^8$ is a group represented by the formula (XIII):

(in which $Y^{22}$ is acryloyloxy group, methacryloyloxy group, vinyl group or allyl group, and $R^{34}$ is a linear or branched alkylene group having 2 to 6 carbon atoms);

$U^1$ is a group represented by the formula (XIV):

(in which $X^{21}$ is covalent bond, oxygen atom or an alkylene glycol group having 1 to 6 carbon atoms, $E^{21}$ is —CONH— group (in this case, $X^{21}$ is covalent bond and $E^{21}$ forms urethane bond with $X^{25}$), or a divalent group derived from a diisocyanate selected from a saturated or unsaturated aliphatic diisocyanate, an alicyclic diisocyanate and an aromatic diisocyanate (in this case, $X^{21}$ is oxygen atom or an alkylene glycol group having 1 to 6 carbon atoms and $E^{21}$ forms urethane bond between $X^{21}$ and $X^{25}$), $X^{25}$ is oxygen atom or an alkylene glycol group having 1 to 6 carbon atoms, and $R^{32}$ is a linear or branched alkylene group having 1 to 6 carbon atoms);

$S^1$ is a group represented by the formula (XV):

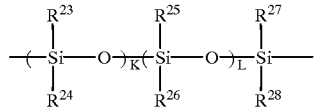

(in which each of $R^{23}$, R24, $R^{25}$, $R^{26}$, $R^{27}$ and $R^{28}$ is independently an alkyl group having 1 to 6 carbon atoms, an alkyl group substituted with fluorine atom or a phenyl group, K is an integer of 1 to 100, and L is an integer which satisfies 0 to (100-K)); and $U^2$ is a group represented by the formula (XVI):

(in which $R^{33}$ is a linear or branched alkylene group having 1 to 6 carbon atoms, $X^{22}$ is covalent bond, oxygen atom or an alkylene glycol group having 1 to 6 carbon atoms, $X^{26}$ is oxygen atom or an alkylene glycol group having 1 to 6 carbon atoms, and $E^{22}$ is —CONH— group (in this case, $X^{22}$ is covalent bond, and $E^{22}$ forms urethane bond with $X^{26}$) or a divalent group derived from a diisocyanate selected from a saturated or unsaturated aliphatic diisocyanate, an alicyclic diisocyanate and an aromatic diisocyanate (in this case, $X^{22}$ is oxygen atom or an alkylene glycol group having 1 to 6 carbon atoms and $E^{22}$ forms urethane bond between $X^{22}$ and $X^{26}$))].

In $A^7$ and $A^8$ of the above formula (XI), both $Y^{21}$ and $Y^{22}$ are polymerizable groups, and preferably acryloyloxy group, methacryloyloxy group and vinyl group.

Both $R^{31}$ and $R^{34}$ are linear or branched alkylene groups having 2 to 6 carbon atoms, and preferably ethylene group, propylene group and butylene group.

In $U^1$ and $U^2$, each of $E^{21}$ and $E^{22}$ represents —CONH— group or a divalent group derived from a diisocyanate selected from a saturated or unsaturated aliphatic diisocyanate, an alicyclic diisocyanate and an aromatic diisocyanate. Examples of a divalent group derived from a diisocyanate selected from a saturated or unsaturated aliphatic diisocyanate, an alicyclic diisocyanate and an aromatic diisocyanate are, for instance, a divalent group derived from a saturated aliphatic diisocyanate such as ethylenediisocyanate, 1,3-diisocyanatepropane or hexamethylenediisocyanate; a divalent group derived from an alicyclic diisocyanate such as 1,2-diisocyanatecyclohexane, bis(4-isocyanatecyclohexyl)methane or isophoronediisocyanate; a divalent group derived from an aromatic diisocyanate such as tolylenediisocyanate or 1,5-diisocyanatenaphthalene; and a divalent group derived from an unsaturated aliphatic diisocyanate such as 2,2'-diisocyanatediethylfumarate. Among these, a divalent group derived from hexamethylenediisocyanate, a divalent group derived from tolylenediisocyanate and a divalent group derived from isophoronediisocyanate are preferable since they are relatively easily available and mechanical strength can be easily imparted to them.

An alkylene glycol having 1 to 6 carbon atoms in $X^{21}$, $X^{25}$, $X^{22}$ and $X^{26}$ of the above $U^1$ and $U^2$ is, for example, a group represented by the formula (XVII):

(XVII)

wherein a is an integer of 1 to 4 and b is an integer of 1 to 5. When b is an integer of at least 6 in the formula (XVIII), there is a tendency that oxygen permeability and mechanical strength are lowered. Therefore, b is preferably an integer of 1 to 5, more preferably an integer of 1 to 3.

In the formula (XV) which represents $S^1$, when $R^{23}$, $R^{24}$, $R^{25}$, $R^{26}$, $R^{27}$ and $R^{28}$ are alkyl groups substituted with fluorine atom, examples are, for instance, 3,3,3-trifluoro-n-propyl group, 3,3,3-trifluoroisopropyl group, 3,3,3-trifluoro-n-butyl group, 3,3,3-trifluoroisobutyl group, 3,3,3-trifluoro-sec-butyl group, 3,3,3-trifluoro-t-butyl group, 3,3,3-trifluoro-n-pentyl group, 3,3,3-trifluoroisopentyl group, 3,3,3-trifluorothiopentyl group and 3,3,3-trifluorohexyl group. When there is employed a polysiloxane macromonomer having an alkyl group substituted with fluorine atom, and the amount thereof is increased, there is a tendency that deposit resistance of an ocular lens material is further improved.

In the formula (XV), K is an integer of 1 to 100 and L is an integer which satisfies 0 to (100-K). When K+L is larger than 100, there are tendencies that molecular weight of a polysiloxane macromonomer becomes voluminous, solubility with the monomer (A-1) or a monomer other than the polysiloxane macromonomer becomes inferior, dissolution at blending becomes insufficient, the copolymerization of the monomer mixture results in opaque and phase-separated materials and that it becomes impossible to obtain a homogeneous and transparent ocular lens material. Also, when K+L is 0, there is a tendency that not only oxygen permeability but also flexibility of an ocular lens material is lowered. K+L is preferably an integer of 10 to 50.

When it is desired to impart high mechanical strength and excellent durability to an ocular lens material, as an other monomer, there can be used, for example, a crosslinkable monomer such as ethylene glycol di(meth)acrylate, diethylene glycol di(meth)acrylate, triethylene glycol di(meth)acrylate, propylene glycol di(meth)acrylate, dipropylene glycol di(meth)acrylate, allyl (meth)acrylate, vinyl (meth)acrylate, trimethylolpropane tri(meth)acrylate, methacryloyloxyethyl acrylate, divinylbenzene, diallyl phthalate, diallyl adipate, triallylisocyanurate, α-methylene-N-vinylpyrrolidone, 4-vinylbenzyl (meth)acrylate, 3-vinylbenzyl (meth)acrylate, 2,2-bis(p-(meth)acryloyloxyphenyl)hexafluoropropane, 2,2-bis(m-(meth)acryloyloxyphenyl)hexafluoropropane, 2,2-bis(o-(meth)acryloyloxyphenyl)hexafluoropropane, 2,2-bis(p-(meth)acryloyloxyphenyl)propane, 2,2-bis(m-(meth)acryloyloxyphenyl)propane, 2,2-bis(o-(meth)acryloyloxyphenyl)propane, 1,4-bis(2-(meth)acryloyloxyhexafluoroisopropyl)benzene, 1,3-bis(2-(meth)acryloyloxyhexafluoroisopropyl) benzene, 1,2-bis(2-(meth)acryloyloxyhexafluoroisopropyl) benzene, 1,4-bis(2-(meth)acryloyoxyisopropyl)benzene, 1,3-bis(2-(meth)acryloyloxyisopropyl)benzene or 1,2-bis(2-(meth)acryloyloxyisopropyl)benzene. These monomers can be used alone or in admixture thereof.

According to the use of the aimed ocular lens such as a contact lens or an intraocular lens, the amount of the other monomer may be suitably adjusted so that the total amount of the monomer mixture containing the monomer (A-1), the silicon-containing monomer and the other monomer reaches 100% by weight.

When the above crosslinkable monomer is used as an other monomer, it is preferable that the amount thereof is 0.01 to 10% by weight based on the total amount of a monomer mixture, in consideration of manifestation of the effect of the crosslinkable monomer and an ocular lens material not becoming brittle.

In the process (I) of the present invention, a prepolymer of the silicone compound can be obtained by adjusting the amount of each component of the monomer mixture to the desired amount, respectively, adding, for instance, a radical polymerization initiator to the monomer mixture, and polymerizing the monomer mixture according to a usual method.

The above usual method is, for instance, a method comprising adding the thermal polymerization initiator to the monomer mixture and carrying out the polymerization by gradually heating the monomer mixture within the range of the temperature from room temperature to about 120° C. (thermal polymerization), or by irradiating the monomer mixture with electromagnetic wave such as microwave, ultraviolet-ray or radiation (gamma rays) (photo polymerization). Further, there can be adopted a method in which heating and irradiation with electromagnetic wave are carried out together. When the thermal polymerization is carried out, the temperature of the monomer mixture may be increased stepwise. The polymerization may be carried out according to a bulk polymerization method, a solution polymerization method using a solvent, or the other methods.

When the above solution polymerization is adopted, a solvent or a mixture thereof can be added to a reaction mixture. In order to obtain the aimed molecular weight of the prepolymer, in consideration of chain transfer constant of the solvent, a general organic solvent and mixture thereof can be used. Examples of the above organic solvent are, for example, an alcohol having 1 to 12 carbon atoms such as ethanol, propanol, butanol, pentanol, hexanol, octanol or decanol; a ketone having 2 to 4 carbon atoms such as acetone or methyl ethyl ketone; acetonitrile; tetrahydrofuran; methylene chloride; chloroform; and the like. The amount of the organic solvent based on 100 parts by weight hereinafter referred to as part(s)) of the total amount of a reaction mixture is 0.1 to 100 parts or so, preferably 20 to 60 parts or so.

Typical examples of the radical polymerization initiator are, or instance, azobisisobutyronitrile, azobisdimethylvaleronitrile, benzoyl peroxide, t-butyl hydroperoxide, cumene hydroperoxide and the like. These can be used alone or in admixture thereof.

When the polymerization is carried out utilizing electromagnetic wave, a photo polymerization initiator can be used alone or in admixture thereof. Examples of the photo polymerization initiator are, for example, a benzoin photo polymerization initiator such as methyl orthobenzoylbenzoate, methyl benzoylformate, benzoin methyl ether, benzoin ethyl ether, benzoin isopropyl ether, benzoin isobutyl ether or benzoin n-butyl ether; a phenone photo polymerization initiator such as 2-hydroxy-2-methyl-7-phenylpropane-1-one, o-isopropyl-α-hydroxyisobutylphenone, p-t-butyltrichloroacetophenone, 2,2-dimethoxy-2-phenylacetophenone, α,α-dichloro-4-phenoxyacetophenone or N,N-tetraethyl-4,4-diaminobenzophenone; 1-hydroxycyclohexyl phenyl ketone; 1-phenyl-1,2-propanedione-2-(o-ethoxycarbonyl)oxime; a thioxanthone photo polymerization initiator such as 2-chlorothioxanthone or 2-methylthioxanthone; dibenzosvarron; 2-ethylanthraquinone; benzophenone acrylate; benzophenone; benzil; and the like. Also, it is preferable to add a photo polymerization sensitizer such as 1,2-benzoanthraquinone to a reaction mixture. The amount of the above polymerization initiator or photo polymerization sensitizer based on 100 parts of the total amount of a monomer mixture is 0.001 to 2 parts or so, preferably 0.01 to 1 part or so.

In this way, a prepolymer of the silicone compound is prepared. Though it is also possible to prepare the silicone compound which is obtained from the prepolymer to form the aimed ocular lens, in the process (I) of the present invention, it is usually preferable to lathe cut the prepolymer of the silicone compound into the aimed ocular lens before reacting the prepolymer with a compound (B-1) which can react with the monomer (A-1) used for preparing the prepolymer.

As a method for forming the prepolymer into an ocular lens such as a contact lens or an intraocular lens, as a forming method which has been usually employed by a person skilled in the art can be employed. Examples of the forming method are, for instance, a lathe cutting process, a molding method and the like. The cutting process is a method comprising carrying out the polymerization in a suitable mold or a suitable container to give a material (copolymer: prepolymer) having a shape such as bar, block or plate and subjecting the material to a mechanical process such as a cutting process or a polishing process to give a formed article having the desired shape. The molding method is a method comprising polymerizing the above monomer mixture in a mold having a shape corresponding to the desired shape of an ocular lens to give a molded product (copolymer: prepolymer) and, as occasion demands, subjecting the molded product to a mechanically finishing process to give a formed article.

When an intraocular lens is produced, a lens and haptics may be separately produced, the haptics may be attached to the lens after production, and the lens and the haptics may be formed at the same time (on the whole).

Next, a silicone compound having a zwitterionic group (I) or (II) is prepared by reacting the prepolymer of the silicone compound obtained in the above method with a compound (B-1) which can react with the monomer (A-1) used for preparing the prepolymer and impart —POO$^-$, —SOO$^-$ or —COO$^-$ to the silicone compound. That is, the zwitterionic group (I) or (II) is introduced into the prepolymer by a polymer reaction.

The above compound (B-1) constitutes anionic parts of the zwitterionic group (I) or (II) in the silicone compound.

Typical examples of the compound (B-1) are, for instance, a compound (B-1a) represented by the formula (V):

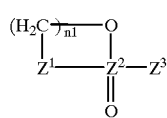

(V)

wherein $Z^1$ is —O—, —S—, —NH— or direct bond, $Z^2$ is P or S, $Z^3$ is a group represented by the formula: —O—R$^8$ in which R$^8$ is a linear or branched aliphatic hydrocarbon group having 1 to 12 carbon atoms or an aromatic hydrocarbon group, a group represented by the formula: —S—R$^8$ in which R$^8$ is the same as the above, a group represented by the formula: —NH—R$^8$ in which R$^8$ is the same as the above or =O, and n1 is an integer of 1 to 20, a compound (B-1b) represented by the formula (VI):

X$^1$—R$^9$—COO—M (VI)

wherein $X^1$ is a halogen atom, M is an alkaline metal atom, R$^9$ is a group represented by the formula:

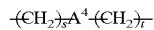

in which A$^4$ is —O—, —S—, —NH— or direct bond, and each of s and t is independently an integer of 1 to 20, and the like. A silicone compound having a zwitterionic group (I) is prepared by a reaction of the compound (B-1a) with the prepolymer and a silicone compound having a zwitterionic group (II) is prepared by a reaction of the compound (B-1b) with the prepolymer.

In the formula (V) which represents the compound (B-1a), it is preferable that R$^8$ is, for instance, an alkyl group having 1 to 12 carbon atoms, an aryl group having 6 to 12 carbon atoms or the like. As to the compound (B-1a), especially 1,3-propane sultone represented by the formula:

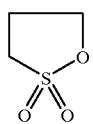

is preferably used.

In the formula (VI) which represents the compound (B-1b), it is preferable that $X^1$ is a halogen atom such as chlorine atom, fluorine atom, bromine atom or iodine atom, and that M is an alkaline metal atom such as sodium atom or potassium atom. As to the compound (B-1b), especially a monochloro acetate salt such as Cl—CH$_2$—COONa or Cl—CH$_2$—COOK is preferably used.

A reaction between the prepolymer and the compound (B-1) may be carried out either without using a solvent or by using an organic solvent.

As to the ratio of the prepolymer to the compound (B-1) in the case of reacting the both without using a solvent, it is desired that the amount of the compound (B-1) based on 1 mole of a functional group in the prepolymer (dialkylaminoalkyl group which can react with the compound (B-1) and is derived from the monomer (A-1), represented by the formula (IV)) is at least 0.0 1 mole, preferably at least 1 mole, in order to sufficiently impart excellent deposit resistance to the silicone compound. Also, in order to restrain difficulty of removing the unreacted compound (B-1) from the silicone compound after reaction, it is desired that the amount of the compound (B-1) based on 1 mole of the functional group in the prepolymer is at most 100 moles, preferably at most 80 moles.

In the case that the prepolymer is reacted with the compound (B-1) by using an organic solvent, when the prepolymer is sufficiently swollen in the organic solvent and then, the swollen prepolymer is reacted with the compound (B-1), there is an advantage that even the inside of the prepolymer is zwitterionized.

Typical examples of the organic solvent are, for instance, an aprotic solvent such as N,N-dimethylformamide, hexane, benzene, toluene, acetonitrile or a halogenated hydrocarbon such as methylene chloride; and the like. Among them, acetonitrile and a halogenated hydrocarbon such as methylene chloride are preferable.

In the case that the organic solvent is used in a reaction, in order to easily react the prepolymer with the compound (B-1) and consequently impart sufficiently excellent deposit resistance to the silicone compound, it is desired that the concentration of the compound (B-1) in the organic solvent is at least 0.01 mol/L, preferably at least 0.1 mol/L. Also, in order to restrain difficulty of removing the unreacted compound (B-1) from the silicone compound after the reaction, it is desired that the concentration of the compound (B-1) in the organic solvent is at most 20 mol/L, preferably at most 5 mol/L. It is preferable that the kinds and the amount of the organic solvent are decided in consideration of the concentration of the compound (B-1) used in the reaction, and furthermore, in consideration of sufficient swelling of the prepolymer in order to increase the introduced amount of a zwitterionic group. In consideration of the both points, acetonitrile and methylene chloride are preferable, and it is preferable that a standard of the amount of the organic solvent is usually 1 to 100 ml or so per 1 g of the prepolymer. Also, in the case that the organic solvent is used, it is important to sufficiently stir or shake the mixture of the organic solvent and the compound (B-1), and carry out the reaction uniformly.

There is no limitation to reaction time of the prepolymer and the compound (B-1) in particular. In order to sufficiently impart excellent deposit resistance to the silicone compound, it is desired that the reaction time is at shortest 1 minute, preferably at shortest 30 minutes. Also, when segments derived from unstable monomers are present in the prepolymer, it is desired that the reaction time is at longest 100 hours, preferably at longest 24 hours in order to remove the possibility of bond-cleavage.

There is also no limitation to reaction temperature of the prepolymer and the compound (B-1) in particular. In order to easily react the prepolymer with the compound (B-1) and sufficiently impart excellent deposit resistance to the silicone compound, it is desired that the reaction temperature is at lowest −30° C., preferably at lowest 20° C. Also, when segments derived from unstable monomers are present in the prepolymer, it is desired that the reaction temperature is at highest 150° C., preferably at highest 80° C. in order to remove the possibility of bond-cleavage.

After the reaction of the prepolymer with the compound (B-1) is finished, it is possible to extract the unreacted compound by using an organic solvent. The solvent used in the extraction may be what can dissolve the unreacted compound. Typical examples of the solvent are, preferably, ethanol, acetone, tetrahydrofuran, acetonitrile and methylene chloride. In the case that the unreacted compound is extracted, it is possible to adopt Soxhlet extraction by using usual Soxhlet extractor. After the extraction, the obtained silicone compound (ocular lens material) may be boiled in water occasionally.

In this way, in accordance with the process (I) of the present invention, an ocular lens material comprising a silicone compound having a zwitterionic compound (I) or a zwitterionic group (II) is prepared.

The introduced amount of the zwitterionic group (I) or (II) in the silicone compound can be suitably varied in accordance with the presence of the organic solvent, the kinds and the amount of the organic solvent, the concentration of the reaction solution, the reaction time and the reaction temperature during the reaction. In order to sufficiently impart excellent deposit resistance to the silicone compound, it is desired that the introduced amount of the zwitterionic group, calculated in terms of monomer parts by weight, is at least 0.5% by weight, preferably at least 2% by weight. Also, in order to restrain lowering of flexibility and mechanical strength of the silicone compound, it is desired that the introduced amount of the zwitterionic group, calculated in terms of monomer parts by weight, is at most 50% by weight, preferably at most 40% by weight. In the present specification, the introduced amount of the zwitterionic group refers to a value calculated by using the ratio of a measured value to a calculated value. These measured value and calculated value are obtained by operating elemental analysis (C, O, N, Si, S or P) on the surface and the inside of a test piece of the silicone compound by using X-ray photoelectron spectroscopy (XPS). The XPS is an analytical process for measuring photoelectron energy emitted by irradiation of a substance with characteristic X-ray of magnesium. The XPS is used for identification of a chemical bond condition of a substance and the like. As to "calculated in terms of monomer parts by weight", a detailed explanation is shown in "Examples".

The process (II) of the present invention is explained below.

In the process (II) of the present invention, a prepolymer of the silicone compound is firstly prepared by copolymerizing a monomer mixture containing a hydroxyl group-containing monomer (A-2) and a silicon-containing monomer.

Typical examples of the hydroxyl group-containing monomer (A-2) are, for instance, a hydroxyalkyl (meth) acrylate such as 2-hydroxyethyl (meth)acrylate, 2-hydroxypropyl (meth)acrylate, 3-hydroxypropyl (meth) acrylate or 4-hydroxybutyl (meth)acrylate; a monomer represented by the formula (XVIII):

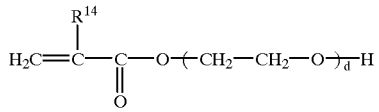

(XVIII)

wherein $R^{14}$ is hydrogen atom or methyl group, d is an integer of 2 to 9; and the like. These can be used alone or in admixture thereof.

In order to sufficiently carry out the reaction of the hydroxyl group-containing monomer (A-2) with a halogenated cyclic compound having phosphorus atom (B-2), which can finally constitute a zwitterionic group in the silicone compound, and in order to impart excellent deposit resistance and excellent wettability to tears to an ocular lens material, it is desired that the amount of the hydroxyl group-containing monomer (A-2) based on the total amount of the monomer mixture is at least 0.5% by weight, preferably at least 2% by weight. In order to restrain lowering of flexibility and mechanical strength of the ocular lens material, it is desired that the amount of the hydroxyl group-containing monomer (A-2) based on the total amount of the monomer mixture is at most 50% by weight, preferably at most 40% by weight.

The kinds of the silicon-containing monomer are not particularly limited. For instance, the monomers exemplified in the above process (I) can be suitably used.

From the same reasons as in the process (I), it is desired that the amount of the silicon-containing monomer based on the total amount of the monomer mixture is at least 5% by weight, preferably at least 10% by weight, and at most 90% by weight, preferably at most 80% by weight.

In the process (II) of the present invention, in addition to the hydroxyl group-containing monomer (A-2) and the silicon-containing monomer, a monomer which is copolymerizable with these monomers, having an unsaturated double bond (hereinafter referred to as other monomer) can be used as a monomer mixture.

Typical examples of the other monomer are, for instance, the other monomers exemplified in the above process (I) except for the hydroxyalkyl (meth)acrylate and polyethylene glycol mono(meth)acrylate which are examples of the hydrophilic monomer can be suitably used.

According to the use of the aimed ocular lens, the amount of the other monomer may be suitably adjusted so that the total amount of the monomer mixture containing the hydroxyl group-containing monomer (A-2), the silicon-containing monomer and the other monomer reaches 100% by weight.

When the crosslinkable monomer is used as an other monomer, it is preferable that the amount of the crosslinkable monomer based on the total amount of the monomer mixture is 0.01 to 10% by weight or so from the same reason as in the above process (I).

In the process (II), in order to prepare the prepolymer of the silicone compound, the process for preparing the above prepolymer of the silicone compound in the process (I) can be suitably employed.

Thus, the prepolymer of the silicone compound is prepared and the silicone compound prepared from the prepolymer can be produced to form the aimed ocular lens. In the process (II) of the present invention, similarly to the process (I), it is preferable that the prepolymer of the silicone compound is usually formed to the aimed ocular lens before the reaction of the prepolymer with the halogenated cyclic compound (B-2).

In order to form the prepolymer to the ocular lens, the same method as in the process (I) can be employed.

Then, in the process (II) of the present invention, in order to prepare the silicone compound by introducing the zwitterionic group (III) into the prepolymer, the reaction proceeds stepwise.

Firstly, hydroxyl group in the prepolymer of the silicone compound is reacted with the halogenated cyclic compound having phosphorus atom (B-2) by using a catalysis such as a tertiary amine to give a prepolymer (B'). Then, phosphorane parts (cyclic parts) derived from the halogenated cyclic compound (B-2) in the prepolymer (B') are cloven by a trialkylamine (C-1) to give the silicone compound having the zwitterionic group (III).

The above compound (B-2) constitutes anionic parts in the zwitterionic group (III) of the silicone compound.

Typical examples of the compound (B-2) are, for instance, a compound (B-2a) represented by the formula (VIII):

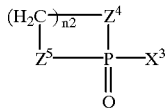

(VIII)

wherein each of $Z^4$ and $Z^5$ is independently —O—, —S—, —NH— or direct bond, in which $Z^4$ and $Z^5$ are not direct bonds at the same time, $X^2$ is a halogen atom, and n2 is an integer of 1 to 20; and the like.

In the formula (VIII) which represents the compound (B-2a), $X^2$ is a halogen atom such as chlorine atom, bromine atom or iodine atom. Among the compounds (B-2a), 2-chloro-2-oxo-1,3,2-dioxaphospholane represented by the formula:

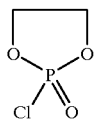

is particularly preferably used.

Examples of the tertiary amine are, for instance, a trialkylamine such as trimethylamine or triethylamine; pyridine; urotropine; dimethylaminopyridine; lutidine and the like. Among them, a trialkylamine such as trimethylamine or triethylamine can be particularly preferably used.

During the reaction of the prepolymer with the compound (B-2), similarly to the reaction of the prepolymer with the compound (B-1) in the process (I), the organic solvent may be used or not.

When the prepolymer is reacted with the compound (B-2) without a solvent, from the same reason as in the reaction of the prepolymer with the compound (B-1) in the process (I), it is desired that the amount of the compound (B-2) based on 1 mole of a functional group (hydroxyl group derived from the hydroxyl group-containing monomer (A-2)) in the prepolymer is at least 0.01 mole, preferably at least 1 mole. In order to restrain the difficulty of removing unreacted compound (B-2) from the prepolymer (B') after the reaction, it is desired that the amount of the compound (B-2) based on 1 mole of the functional group in the prepolymer is at most 100 moles, preferably at most 30 moles.

When the prepolymer is reacted with the compound (B-2) by using the organic solvent, in the case that the prepolymer is previously sufficiently swollen in the organic solvent and then, the swollen prepolymer is reacted with the compound (B-2), there is an advantage that even the inside of the prepolymer can be zwitterionized.

The same organic solvents as is exemplified in the process (I) can be suitably used.

In the case that the organic solvent is used for the reaction of the prepolymer with the compound (B-2), in order to easily react the prepolymer with the compound (B-2), it is desired that the concentration of the compound (B-2) in the organic solvent is at least 0.01 mol/L, preferably at least 0.1 mol/L. In order to restrain the difficulty of removing unreacted compound (B-2) from the prepolymer (B') after the reaction, it is desired that the concentration of the compound (B-2) in the organic solvent is at most 20 mol/L, preferably at most 5 mol/L. In consideration of the concentration of the compound (B-2) used for the reaction, similarly to the process (I), and furthermore, in consideration of sufficient swelling of the prepolymer in order to increase the introduced amount of a zwitterionic group, acetonitrile and methylene chloride are preferable. Also, in consideration of these points, it is a standard that the amount of the organic solvent per 1 g of the prepolymer is usually 1 to 100 ml or so. When the organic solvent is used, it is important that the organic solvent and the compound (B-2) are sufficiently stirred or shaken with each other and the reaction proceeds uniformly.

The reaction time and the reaction temperature are not particularly limited in the reaction of the prepolymer with the compound (B-2). In order to restrain side reaction and carry out a rapid progress of the reaction, it is desired that the reaction temperature is −50° to 50° C., preferably −30° to 0° C., and that the reaction time is 30 minutes to 50 hours, preferably 1 to 24 hours.

After the reaction of the prepolymer with the compound (B-2) is finished, unreacted compounds can be extracted with an organic solvent such as ethanol, acetone, tetrahydrofuran, acetonitrile or methylene chloride.

The thus obtained prepolymer (B') is reacted with a trialkylamine (C-1) represented by the formula (VII):

$$N(R^4)_3 \qquad (VII)$$

wherein $R^4$ is hydrogen atom or a linear or branched alkyl group having 1 to 10 carbon atoms, in which three groups represented by $R^4$ may be the same or different with each other, so that the silicone compound having a zwitterionic group (III) is prepared. That is, the zwitterionic group (III) is introduced into the prepolymer (B') by a polymer reaction.

The $N^+$ derived from the above trialkylamine (C-1) constitutes cationic parts in the zwitterionic group (III) of the silicone compound.

Typical examples of the trialkylamine (C-1) are, for instance, trimethylamine, triethylamine, tripropylamine, tributylamine, dimethylethylamine, methyldiethylamine and the like.

During the reaction of the prepolymer (B') with the trialkylamine (C-1), similarly to the reaction of the prepolymer with the compound (B-2), the organic solvent may be used or not. The same organic solvents as that exemplified in the reaction of the prepolymer with the compound (B-2) can be suitably used.

When the prepolymer (B') is reacted with the trialkylamine (C-1), in order to sufficiently cleave phospholane parts (cyclic parts) in the prepolymer (B'), it is desired that the amount of the trialkylamine (C-1) based on 1 mole of the phospholane parts in the prepolymer (B') is at least 0.8 mole, preferably at least 1 mole. In order to easily remove unreactants from the silicone compound after the reaction, it is desired that the amount of the trialkylamine (C-1) based on 1 mole of the phospholane parts in the prepolymer (B') is at most 20 moles, preferably at most 18 moles.

The reaction time is not particularly limited in the reaction of the prepolymer (B') with the trialkylamine (C-1). In order to sufficiently impart excellent deposit resistance to the silicone compound, it is desired that the reaction time is at shortest 1 hour, preferably at shortest 5 hours. In the case that there are segments derived from unstable monomers in the prepolymer (B'), in order to remove the possibility of bond-cleavage, it is desired that the reaction time is at longest 100 hours, preferably at longest 50 hours.

The reaction temperature is not particularly limited in the reaction of the prepolymer (B') with the trialkylamine (C-1). In order to easily react the prepolymer (B') with the trialkylamine (C-1), and in order to sufficiently impart excellent deposit resistance to the silicone compound, it is desired that the reaction temperature is at lowest −30° C., preferably at lowest 0° C. In the case that there are segments derived from unstable monomers in the prepolymer (B'), in order to remove the possibility of bond-cleavage, it is desired that the reaction temperature is at highest 150° C., preferably at highest 80° C.

After the reaction of the prepolymer (B') with the trialkylamine (C-1) is finished:, unreacted compounds can be extracted with an organic solvent such as ethanol, acetone, tetrahydrofuran, acetonitrile or methylene chloride. In order to extract the unreacted compounds, Soxhlet extraction can be carried out by using usual Soxhlet extractor. After the extraction, as occasion demands, the obtained silicone compound (ocular lens material) may be boiled in water.

Thus, in accordance with the process (II) of the present invention, the ocular lens material comprising the silicone compound having the zwitterionic group (III) can be produced. The introduced amount of the zwitterionic group (III) in the silicone compound can be suitably varied according to, as mentioned above, the presence of the organic solvent, the kinds and the amount of the organic solvent, the concentration of the reaction solution, the reaction time and the reaction temperature during the reaction. In order to sufficiently impart deposit resistance to the silicone compound, it is desired that the introduced amount of the zwitterionic group, calculated in terms of monomer parts by weight, is at least 0.5% by weight, preferably at least 2% by weight. In order to restrain lowering of flexibility and mechanical strength of the silicone compound, it is desired that the introduced amount of the zwitterionic group, calculated in terms of monomer parts by weight, is at most 50% by weight, preferably at most 40% by weight.

The ocular lens material and the process for preparing the same of the present invention are more specifically described and explained by means of the following Examples. It is to be understood that the present invention is not limited to the Examples, and various changes and modifications may be made in the invention without departing from the spirit and scope thereof.

EXAMPLE 1

Ocular Lens Material made of Silicone Compound Containing Sulfopropylammonium Betaine as Zwitterionic Group

[1] Preparation of Prepolymer of Silicone Compound

As monomer mixtures, 10 parts of urethane bond-containing polysiloxane macromonomer (hereinafter referred to as macromonomer A) represented by the formula:

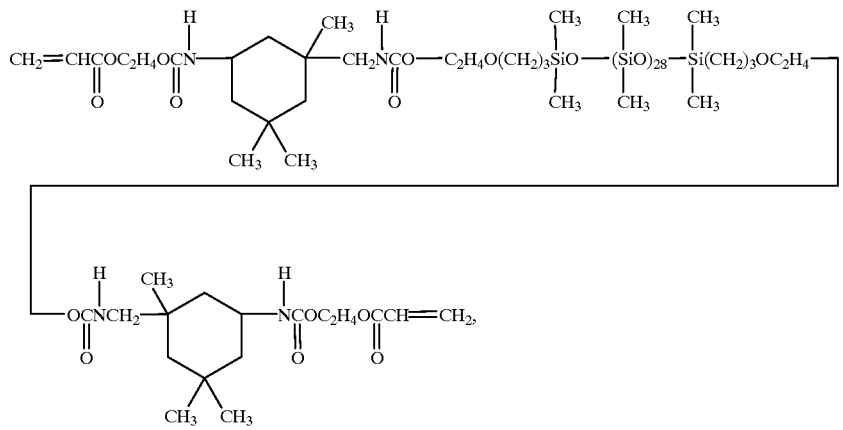

40 parts of tris(trimethylsiloxy)silylpropyl methacrylate (hereinafter referred to as SiMA), 45 parts of N,N-dimethylacrylamide (hereinafter referred to as DMAA), 5 parts of N,N-dimethylaminoethyl methacrylate (hereinafter referred to as DMAEMA) and 0.5 part of ethylene glycol dimethacrylate (hereinafter referred to as EDMA) were used. The monomer mixtures and 0.1 part of 2,2'-azobis(2,4-dimethylvaleronitrile) (hereinafter referred to as V-65) as a polymerization initiator were uniformly mixed with each other to give a transparent solution. The transparent solution was poured into a test tube made of glass.

After the test tube was put into a thermostated water bath and heated at 35° C. for 40 hours and at 50° C. for 8 hours, the test tube was transferred from the thermostated water bath to a circulating dry oven. The test tube was heated with gradually increasing the temperature of the solution to 110° C. at the ratio of 10° C. per 2 hours, and the polymerization was completed to give a copolymer (prepolymer) having a diameter of 13.5 mm and a shape like bar. The copolymer was excellent in transparency and could be suitably used as an ocular lens material.

The copolymer having a shape like bar was cut and polished into a plate having a thickness of 0.2 mm.

[2] Introduction of Sulfopropylammonium Betaine as Zwitterionic Group by Polymer Reaction (Preparation of Silicone Compound)

The process for preparing a silicone compound is shown by the following reaction formula (A).

Reaction formula (A)

$$\text{Prepolymer} \xrightarrow[\text{(60° C.)}]{\text{CH}_3\text{CN}} + \text{1,3-Propane sultone} \longrightarrow \text{Sulfopropylammonium betaine grafted polymer}$$

In a lens vial, the above plate was immersed and swollen in acetonitrile. Acetonitrile was used in the amount of 1.0 ml per one plate (dry weight: 0.018 g). After 0.015 g (0.125 mmol) of 1,3-propane sultone was added to the vial and the vial was sealed, the temperature of the contents was adjusted to 60° C. in a thermostated water bath with shaking system. The contents were reacted with each other with shaking for 5 hours.

After the reaction was finished, Soxhlet extraction was carried out in acetone for about 8 hours. By Soxhlet extraction, unreactants were removed from reactants to give a plate of the silicone compound. After the plate was immersed in saline, the plate was hydrated by boiling for 8 hours to give a transparent test piece (hydrogel).

Physical properties of the test piece were examined in accordance with the following methods. The results are shown in TABLE 1.

(1) Transparency

The test piece in water was observed with naked eyes and transparency of the test piece was evaluated based on the following criteria for evaluation.

(Criteria for evaluation)
   ○: Transparent
   Δ: Slightly opaque
   X: Extremely opaque (2) Water Content The weight of the test piece in the equilibrium swollen state after hydration (W (g)) was measured. Also, the weight of the test piece in the dry state after drying of the swollen test piece in an oven (Wo (g)) was measured. Using the values of W and Wo, water content (% by weight) of the test piece was calculated in accordance with the following equation.

Water content (% by weight)={(W−Wo)/W}×100

(3) Refractive Index

Using "refractive index meter 1T" made by Atago Co., Ltd., refractive index (no unit) of the test piece was measured at 25° C. and under the relative humidity of 50%.

(4) Oxygen Permeability (Dk)

Using "Seikaken-type film oxygen-gas permeator" made by RIKASEIKI KOGYO CO., LTD., oxygen permeability of the test piece was measured in physiological sodium chloride solution at 35° C.

The unit of oxygen permeability is $(cm^2/sec)\cdot(mlO_2/(ml \times mmHg))$, and the numerical value shown in TABLE 1 and the following TABLE 2 and TABLE 3 was obtained by multiplying the measured value of the test piece having a thickness of 0.2 mm or 0.4 mm by $10^{11}$ times.

(5) Deposit Resistance (i) Test for Adhesion of Protein

The test piece was immersed in FDA artificial tear solution (protein concentration: 6.69 mg/ml) and was shaken at 37° C. for 5 hours. Then, the artificial lacrimal fluid was extracted with 1% sodium dodecylsulfate (SDS) solution at 37° C. for 3 hours. The amount of protein in an extract was quantified in accordance with bicinchoninic acid method and the adhering protein amount ($\mu g/cm^2$) per 1 $cm^2$ of the test piece was obtained.

(ii) Test for Adhesion of Lipid

The test piece was immersed in an artificial ocular lipid (lipid oncentration: 5.0 mg/ml) containing wax ester, cholesterol ester and tripalmitin as main components and was shaken at 37° C. for 5 hours. Then, the artificial ocular lipid was extracted with ethanol/ diethyl ether mixture solution (volume ratio: 1/1) at 25° C. for 10 minutes. The amount of lipid in an extract was quantified in accordance with Sulfo-Phospho-Vanillin method and the adhering lipid amount ($mg/cm^2$) per 1 $cm^2$ of the test piece was obtained.

EXAMPLES 2 to 4

Ocular Lens Materials made of Silicone Compound Containing Sulfopropylammonium Betaine as Zwitterionic Group Prepolymers of silicone compound were prepared in the same manner as in EXAMPLE 1 except that the composition of the monomer mixtures used for preparation of the prepolymer of the silicone compound in EXAMPLE 1 was changed to the composition shown in TABLE 1. Then, plates of the silicone compound were produced to give transparent test pieces in the same manner as in EXAMPLE 1.

Physical properties of the test pieces were examined in the same manner as in EXAMPLE 1. The results are shown in TABLE 1.

EXAMPLE 5

Ocular Lens Material made of Silicone Compound Containing Phosphorylethylammonium Betaine as Zwitterionic Group

[1] Synthesis of 2-methoxy-2-oxo-1,3,2-dioxaphospholane

The process for synthesizing 2-methoxy-2-oxo- 1,3,2-dioxaphospholane is shown by the following reaction formula (B).

Reaction formula (B)

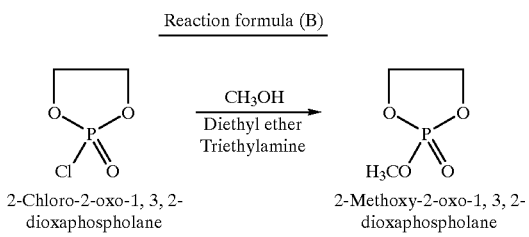

To a three-necked flask to which Dimroth condenser and a dropping funnel were attached was added a mixture solution of 40 ml of dry diethyl ether, 0.32 g (10 mmol) of methanol and 1.01 g (10 mmol) of triethylamine, and the mixture solution was cooled to 0° C. in an ice bath.

Into the above three-necked flask was slowly dropped 1.43 g (10 mmol) of 2-chloro-2-oxo-1,3,2-dioxaphospholane dissolved in 25 ml of dry diethyl ether with maintaining the temperature at 5° C. or less. After dropping is finished, the contents in the three-necked flask was heated to room temperature and stirred for 16 hours to give 2-methoxy-2-oxo-1,3,2-dioxaphospholane.

From the above 2-methoxy-2-oxo-1,3,2-dioxaphospholane, the generated hydrochloride of triethylamine was filtrated and removed, and the solvent was distilled under reduced pressure. Then, the obtained 2-methoxy-2-oxo-1,3,2-dioxaphospholane was substituted in acetonitrile solution.

[2] Preparation of Prepolymer of Silicone Compound

A plate was produced in the same manner as in EXAMPLE 2.

[3] Introduction of Phosphorylethylammonium Betaine as Zwitterionic Group by Polymer Reaction (Preparation of Silicone Compound)

The process for preparing a silicone compound is shown by the following reaction formula (C).

Reaction formula (C)

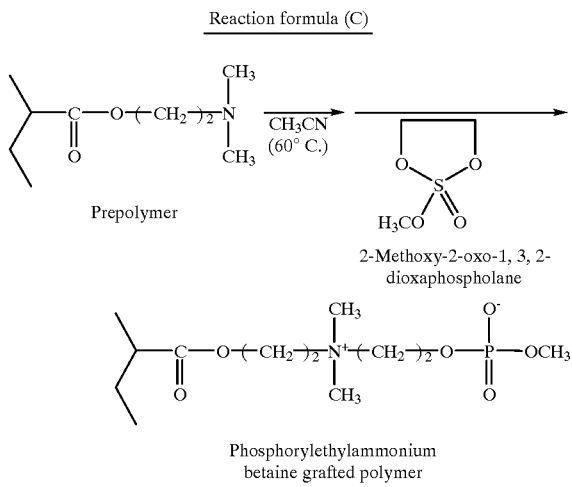

In a lens vial, the above plate was immersed and swollen in acetonitrile. Acetonitrile was used in the amount of 1.0 ml per one plate (dry weight: 0.020 g). After 0.11 g (0.80 mmol) of 2-methoxy-2-oxo-1,3,2-dioxaphospholane was added to the vial and the vial was sealed, the temperature of the contents was adjusted to 60° C. in a thermostated water bath with shaking system. The contents were reacted with each other with shaking for 5 hours.

After the reaction was finished, Soxhlet extraction was carried out in acetone for about 8 hours. By Soxhlet extraction, unreactants were removed from reactants to give a plate of the silicone compound. Then, the plate was hydrated in the same manner as in EXAMPLE 1 to give a transparent test piece (hydrogel).

Physical properties of the test piece were examined in the same manner as in EXAMPLE 1. The results are shown in TABLE 1.

EXAMPLE 6

Ocular Lens Material made of Silicone Compound Containing Phosphorylethylammonium Betaine as Zwitterionic Group

[1] Preparation of Prepolymer of Silicone Compound

As monomer mixtures, 40 parts of macromonomer A, 30 parts of SiMA, 25 parts of 2-hydroxyethyl methacrylate (hereinafter referred to as HEMA), 5 parts of DMAEMA and 1.0 part of EDMA were used to give a mixture solution. To the mixture solution was added 1-butanol as a diluent in the amount of 60 parts based on 100 parts of the total amount of the monomer mixtures. To the mixture solution was added 2-hydroxy-2-methyl-1-phenylpropane-1-one (hereinafter referred to as HMPPO) as a photo polymerization initiator in the amount of 0.2 part based on 100 parts of the total amount of the monomer mixtures. Then, they were uniformly mixed with each other to give a mixture.

A mold having the desired shape like plate, made of polypropylene, was filled with the above mixture. Then, the mold was irradiated with ultraviolet ray at room temperature for 1 hour to give a plate of copolymer (prepolymer). The plate was excellent in transparency and could be suitably used as an ocular lens material. By Soxhlet extraction in 2-propanol for about 8 hours, unreactants were removed from the plate.

[2] Introduction of Phosphorylethylammonium Betaine as Zwitterionic Group by Polymer Reaction (Preparation of Silicone Compound)

With acetonitrile was sufficiently substituted 2-propanol which was used as a solvent for extraction of the plate.

In a lens vial, the above plate was immersed and swollen in acetonitrile. Acetonitrile was used in the amount of 1.0 ml per one plate (dry weight: .0.06 g). After 0.105 g (0.76 mmol) of 2-methoxy-2-oxo-1,3,2-dioxaphospholane was added to the vial and the vial was sealed, the temperature of the contents was adjusted to room temperature in a thermostated water bath with shaking system. The contents were reacted with each other with shaking for 5 hours.

After the reaction was finished, Soxhlet extraction was carried out in acetone for about 8 hours. By Soxhlet extraction, unreactants were removed from reactants to give a plate of the silicone compound. Then, the plate was hydrated in the same manner as in EXAMPLE 1 to give a transparent test piece (hydrogel).

Physical properties of the test piece were examined in the same manner as in EXAMPLE 1. The results are shown in TABLE 1.

EXAMPLE 7

Ocular Lens Material made of Silicone Compound Containing Phosphorylethylammonium Betaine as Zwitterionic Group A prepolymer of a silicone compound was prepared in the same manner as in EXAMPLE 6 except that the composition of the monomer mixtures used for preparation of the prepolymer of the silicone compound in EXAMPLE 6 was changed to that shown in TABLE 1. Then, a plate of the silicone compound was produced to give a transparent test piece in the same manner as in EXAMPLE 6.

Physical properties of the test piece were examined in the same manner as in EXAMPLE 1. The results are shown in TABLE 1.

EXAMPLE 8

Ocular Lens Material made of Silicone Compound Containing Sulfopropylammonium Betaine as Zwitterionic Group

[1] Preparation of Prepolymer of Silicone Compound

As monomer mixtures, 46 parts of tris(trimethylsiloxysilyl)styrene (hereinafter referred to as SiSt), 54 parts of 2,2,2,2',2',2'-hexafluoroisopropyl methacrylate (hereinafter referred to as 6FMA), 10 parts of DMAEMA, 6 parts of vinylbenzyl methacrylate (hereinafter referred to as VBMA) and 1 part of EDMA were used. The monomer mixtures and 0.1 part of V-65 as a polymerization initiator were uniformly mixed with each other to give a transparent solution. The transparent solution was poured into a test tube made of glass.

After the test tube was put into a thermostated water bath and heated at 35° C. for 40 hours and at 50° C. for 8 hours, the test tube was transferred from the thermostated water bath to a circulating dry oven. The test tube was heated with gradually increasing the temperature of the solution to 120° C. at the ratio of 10° C. per 2 hours, and the polymerization was completed to give a copolymer (prepolymer) having a diameter of 15.0 mm and a shape like bar. The copolymer was excellent in transparency and could be suitably used as an ocular lens material.

The copolymer having a shape like bar was cut and polished into a plate having a thickness of 0.2 mm or 4.0 mm.

[2] Introduction of Sulfopropylammonium Betaine as Zwitterionic Group by Polymer Reaction (Preparation of Silicone Compound)

In a lens vial, the above plate (dry weight: 0.018 g) was put into 0.015 g (0.125 mmol) of 1,3-propane sultone. After the vial was sealed, the temperature of the contents was adjusted to 60° C. in a thermostated water bath with shaking system. The contents were reacted with each other with shaking for 5 hours.

After the reaction was finished, the plate was immersed in ethanol for about 8 hours and unreactants were removed from reactants to give a plate of the silicone compound. Then, the plate was washed with "Menicon O₂ care" made by Menicon Co., Ltd. and dried to give a transparent test piece.

As physical properties of the test piece, transparency, refractive index, oxygen permeability and deposit resistance (test for adhesion of lipid) were examined in the same manner as in EXAMPLE 1. Contact angle was examined in accordance with the following method. The results are shown in TABLE 2.

(6) Contact Angle

Using "Goniometer-type contact angle meter G-1" made by Elma Optical Works, Ltd., contact angle (degree) of the dry test piece having a thickness of 4.0 mm was measured at 25° C. in accordance with liquid-drop method.

EXAMPLE 9

Ocular Lens Material made of Silicone Compound Containing Phosphorylcholine as Zwitterionic Group

[1] Preparation of Prepolymer of Silicone Compound

As monomer mixtures, 40 parts of macromonomer A, 30 parts of SiMA, 30 parts of HEMA and 1.0 part of EDMA were used to give a mixture solution. To the mixture solution was added 1-butanol as a diluent in the amount of 60 parts based on 100 parts of the total amount of the monomer mixtures. To the mixture solution was added HMPPO as a photo polymerization initiator in the amount of 0.2 part based on 100 parts of the total amount of the monomer mixtures. Then, they were uniformly mixed with each other to give a mixture.

A mold having the desired shape like plate, made of polypropylene, was filled with the above mixture. Then, the mold was irradiated with ultraviolet ray at room temperature for 1 hour to give a plate of copolymer (prepolymer). The plate was excellent in transparency and could be suitably used as an ocular lens material. By Soxhlet extraction in 2-propanol for about 8 hours, unreactants were removed from the plate.

[2] Introduction of Phosphorylcholine as Zwitterionic Group by Polymer Reaction (Preparation of Silicone Compound)

The process for preparing a silicone compound is shown by the following reaction formula (D).

Reaction formula (D)

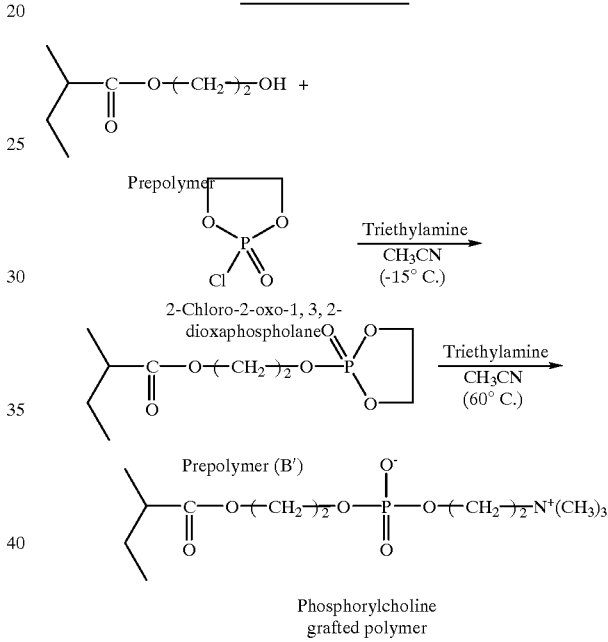

Phosphorylcholine grafted polymer

With acetonitrile was sufficiently substituted 2-propanol which was used as a solvent for extraction of the plate.

In a lens vial, the above plates were immersed and swollen in acetonitrile. Acetonitrile was used in the amount of 40 ml per ten plates (dry weight: 0.60 g). To the vial was added 2.00 g (20 mmol) of triethylamine, and the contents was cooled to −15° C. by using dry ice/methanol. With maintaining the temperature at −10° C. or less, 2.86 g (20 mmol) of 2-chloro-2-oxo-1,3,2-dioxaphospholane was gradually dropped into the vial for one hour, and stirring was continued for 2 hours. After the reaction was finished, the temperature of the contents was recovered up to room temperature, and the plates were taken out from the vial and immersed in acetonitrile to extract unreactants.

The plates were immersed in 30 mL of acetonitrile in Medium vial, and 10.0 ml (about 20 mmol) of trimethylamine was added to the vial, The vial was sealed and the contents were reacted with each other at 50° C. for 24 hours.

After the reaction was finished, the temperature of the contents was recovered up to room temperature and the plates were taken out from the vial. Then, Soxhlet extraction was carried out in ethanol for about 8 hours. By Soxhlet extraction, unreactants were removed from reactants to give plates of the silicone compound. Then, the plates were hydrated in the same manner as in EXAMPLE 1 to give transparent test pieces (hydrogel).

Each physical property of the test pieces was examined in the same manner as in EXAMPLE 1. The results are shown below.

Transparency: evaluation ○
Water content: 19% by weight
Refractive index: 1.422 (no unit)
Oxygen permeability: $56 \times 10^{-11}$ (cm$^2$/sec)·(mlO$_2$/(ml× mmHg))
Deposit resistance:
  Adhering protein amount: 0.24 μg/cm$^2$
  Adhering lipid amount: 0.88 mg/cm$^2$ The amount of the compound (B-2) based on 1 mole of the functional group (hydroxyl group) in the prepolymer was 15 moles, the concentration of the compound (B-2) in the organic solvent was 0.5 mol/L, the amount of the trialkylamine (C-1) (trimethylamine) based on 1 mole of the phospholane parts in the prepolymer (B') was 15 moles and the introduced amount of the zwitterionic group in the silicone compound was 26% by weight (calculated in terms of monomer parts by weight).

COMPARATIVE EXAMPLE 1

Were mixed 10 parts of macromonomer A, 40 parts of SiMA, 50 parts of DMAA and 0.3 part of EDMA to give a transparent monomer solution. After mixing 5 parts of dimethyl-2-methacryloyloxyethyl-3-sulfopropylammonium betaine monomer (hereinafter referred to as SAMA) as a monomer having a zwitterionic group, represented by the formula:

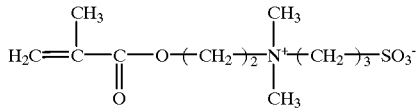

with methanol as a diluent in the amount of 60 parts based on 100 parts of the total amount of the monomer mixtures in which the monomer solution and SAMA were blended, the mixture was added to the monomer solution. Then the mixture solution became slightly opaque. To the mixture solution was added HMPPO as a photo polymerization initiator in the amount of 0.2 part based on 100 parts of the total amount of the monomer mixtures. Then, they were thoroughly mixed with each other to give a mixture.

A mold having the desired shape like plate, made of polypropylene, was filled with the above mixture. Then, the mold was irradiated with ultraviolet ray at room temperature for 1 hour to give a copolymer. However, the copolymer was completely opaque and transparency thereof was lost, which could not be used as an ocular lens material.

COMPARATIVE EXAMPLE 2

A copolymer having a shape like bar was prepared in the same manner as in EXAMPLE 1 except that DMAEMA was not used, and a plate was produced by cutting and polishing the copolymer to obtain a thickness of 0.2 mm. Then, the plate was hydrated in the same manner as in EXAMPLE 1 to give a test piece (hydrogel).

Each physical property of the test piece was examined in the same manner as in EXAMPLE 1. The results are shown in TABLE 1.

COMPARATIVE EXAMPLES 3 to 5

After preparing the monomer mixtures (polymerization components) to have the composition shown in TABLE 3, 50 parts of methanol/water mixture solution (weight ratio: 1/1) as a diluent was mixed with 100 parts of the total amount of the monomer mixtures to give a mixture solution. To the mixture solution was added HMPPO as a photo polymerization initiator in the amount of 0.2 part based on 100 parts of the total amount of the monomer mixtures. Then, they were uniformly mixed with each other to give a mixture.

A mold having the desired shape like plate, made of polypropylene, was filled with the above mixture. Then, the mold was irradiated with ultraviolet ray at room temperature for 1 hour to give a plate of copolymer. Soxhlet extraction was carried out in methanol for about 8 hours to remove unreactants from the plate. Then, the plate was hydrated in the same manner as in EXAMPLE 1 to give a test piece (hydrogel).

As physical properties of the test piece, transparency, water content and oxygen permeability were examined in the same manner as in EXAMPLE 1. The results are shown in TABLE 3.

COMPARATIVE EXAMPLE 6

A copolymer having a shape like bar was prepared in the same manner as in EXAMPLE 8 except that DMAEMA was not used, and a plate was produced by cutting and polishing the copolymer to obtain a thickness of 0.2 mm or 4.0 mm. Then, the plate was washed with the surface active agent ("Menicon O$_2$ care") and dried to give a test piece in the same manner as in EXAMPLE 8.

Each physical property of the test piece was examined in the same manner as in EXAMPLE 8. The results are shown in TABLE 2.

Each code of "Kinds of zwitterionic group" in TABLE 1 and TABLE 2 shows the following.
SA: Sulfopropylammonium betaine
PA: Phosphorylethylammonium betaine In TABLE 3, MPC used as a monomer mixture is 2-methacryloyloxyethyl phosphorylcholine represented by the formula:

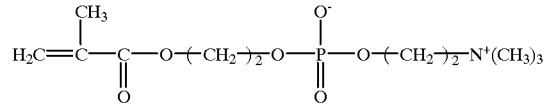

In COMPARATIVE EXAMPLE 3, oxygen permeability shown in TABLE 3 is the value as to the test piece having a thickness of 0.4 mm.

In TABLE 1 and TABLE 2, the amount of the compound (B-1) (mole(s)) per 1 mole of the functional group (dialkylaminoalkyl group) in the prepolymer, the concentration of the compound (B-1) in the organic solvent (mol/L), and the introduced amount of the zwitterionic group (% by weight, calculated in terms of monomer parts by weight) in the silicone compound are also shown.

The above introduced amount of the zwitterionic group (% by weight, calculated in terms of monomer parts by weight) was calculated in accordance with the following method.

Using "X-ray photoelectron spectroscopy (XPS) JPS-9000MX type" made by JEOL LTD., elemental composition (C, O, N, Si, S or P) on the surface of the dry test piece of the silicone compound was examined. As one example, the result for the silicone compound in EXAMPLE 1 is shown below. Each elemental composition as to the silicone compounds in EXAMPLES 2 to 9 was examined in the same manner.

Based on the weight ratio of monomers and chemical formula of each monomer in the prepolymer, the molar ratio of monomers was calculated.

Ratio of Elemental composition of Prepolymer (Calculated value)

| Monomer | Weight ratio (parts) | Chemical formula | Molecular weight | Molar ratio (% by mole) |
|---|---|---|---|---|
| Macro-monomer A | 10 | $C_{124}H_{304}O_{53}N_4Si_{40}$ | 3816 | 0.45 |
| SiMA | 40 | $C_{16}H_{38}O_5Si_4$ | 422 | 16.24 |
| DMAA | 45 | $C_5H_8ON$ | 99 | 77.86 |
| DMAEMA | 5 | $C_8H_{15}O_2N$ | 157 | 5.45 |

Using the value of the molar ratio, elemental ratio (calculated value) in the prepolymer was calculated.

C/O/N/Si (%)=67.4/17.4/7.7/7.5

The theoretical amount of nitrogen atom, 7.7%, is constituted of 0.2% of macromonomer A, 7.0% of DMAA and 0.5% of DMAEMA. Accordingly, it can be seen that when 100% of dimethylamino group in DMAEMA reacts during introducing reaction of the zwitterionic group, elemental ratio (calculated value) of sulfur is 0.5%.

Using elemental ratio (measured value) of sulfur obtained by elemental analysis of the test piece after finish of introducing reaction of the zwitterionic group, and elemental ratio (calculated value) of sulfur obtained in accordance with the above method, the introduced amount of the zwitterionic group was obtained.

The result of XPS analysis after finish of introducing reaction of the zwitterionic group is shown below.

Ratio of Elemental composition of Silicone compound containing Zwitterionic group

| Element | C | O | N | Si | S |
|---|---|---|---|---|---|
| Calculated value (%) | 67.4 | 17.4 | 7.7 | 7.5 | 0.0(0.5*) |
| Measured value (%) | 63.4 | 17.6 | 11.3 | 7.2 | 0.5 |

*Figure in parenthesis is a theoretical value in a complete (100%) reaction.

Coefficient of introducing reaction of zwitterionic group (%) is calculated in accordance with the following equation.

Coefficient of introducing reaction of zwitterionic group (%)={Elemental ratio of sulfur (measured value)/Elemental ratio of sulfur (calculated value)}×100

The coefficient of introducing reaction can be concretely calculated as shown below.

Coefficient of introducing reaction of zwitterionic group (%)=(0.5/0.5)×100=100

Accordingly, the introduced amount of the zwitterionic group (calculated in terms of monomer parts by weight) in the silicone compound, 5% by weight, was shown by the used amount of DMAEMA, 5 parts.

TABLE 1

| | Monomer mixture of prepolymer (copolymer) (part(s)) | | | | | | Kinds zwitterionic group | Amount of Compound (B-1) based on 1 mole of functional group (mole(s)) | Concentration of compound (B-1) in organic solvent (mol/L) | Introduced amount of zwitterionic group (% by weight (calculated in terms of monomer parts by weight)) |
|---|---|---|---|---|---|---|---|---|---|---|
| Ex. No. | Macro-monomer A | SiMA | DMAA | HEMA | DMAEMA | EDMA | | | | |
| 1 | 10 | 40 | 45 | — | 5 | 0.5 | SA | 20 | 0.125 | 5 |
| 2 | 10 | 40 | 40 | — | 10 | 0.5 | SA | 20 | 0.125 | 10 |
| 3 | 10 | 40 | 30 | — | 20 | 0.5 | SA | 20 | 0.125 | 20 |
| 4 | 10 | 40 | 20 | — | 30 | 0.5 | SA | 20 | 0.125 | 30 |
| 5 | 10 | 40 | 40 | — | 10 | 0.5 | PA | 60 | 0.80 | 10 |
| 6 | 40 | 30 | — | 25 | 5 | 1.0 | PA | 35 | 0.76 | 5 |
| 7 | 40 | 30 | — | 20 | 10 | 1.0 | PA | 35 | 0.76 | 10 |
| Com. Ex. No. 2 | 10 | 40 | 50 | — | — | 0.5 | — | — | — | — |

| | Property of test piece | | | | | |
|---|---|---|---|---|---|---|
| | | | | | Deposit resistance | |
| Ex. No. | Transparency | Water content (% by weight) | Refractive index (−) | Oxygen permeability* (Dk) | Adhering protein amount ($\mu g/cm^2$) | Ahering lipid amount ($mg/cm^2$) |
| 1 | ○ | 47 | 1.414 | 34 | 0.32 | 1.23 |
| 2 | ○ | 50 | 1.410 | 35 | 0.34 | 1.08 |

TABLE 1-continued

|   |         |   |    |       |    |      |      |
|---|---------|---|----|-------|----|------|------|
|   | 3       | ○ | 52 | 1.411 | 28 | 0.43 | 1.06 |
|   | 4       | ○ | 53 | 1.411 | 25 | 0.71 | 0.60 |
|   | 5       | ○ | 57 | 1.402 | 31 | 0.37 | 0.60 |
|   | 6       | ○ | 22 | 1.434 | 69 | 0.47 | 1.12 |
|   | 7       | ○ | 33 | 1.425 | 68 | 0.52 | 0.82 |
|   | Com. Ex. No. 2 | ○ | 47 | 1.413 | 34 | 1.14 | 1.49 |

*Measured value of test piece having thickness of 0.2 mm

TABLE 2

| Ex. No. | Monomer mixture of prepolymer (copolymer)(part(s)) | | | | | Kinds of zwitter0 ionic group | Amount of compound (B-1) based on 1 mole of functional group (mole(s)) | Introduced amount of zwitterionic group (% by weight (calculated in terms of monomer parts by weight)) |
|---|---|---|---|---|---|---|---|---|
|   | SiSt | 6FMA | DMA EMA | VBMA | EDMA | | | |
| 8 | 46 | 54 | 10 | 6 | 1 | SA | 11 | 10 |
| Com Ex. No. 6 | 46 | 54 | — | 6 | 1 | SA | — | — |

| | Property of test piece | | | | |
|---|---|---|---|---|---|
| Ex. No. | Transparency | Refractive index (−) | Oxygen permeability* (Dk) | Deposit resistance (Adhering lipid amount (mg/cm$^2$)) | Contact angle (degree) |
| 8 | ○ | 1.430 | 96 | 0.11 | 66 |
| Com. Ex. No. 6 | ○ | 1.432 | 109 | 0.30 | 90 |

*Measured value of test piece having thickness of 0.2 mm

TABLE 3

| Com. Ex. No. | Monomer mixture of copolymer (part(s)) | | | | | Transparency | Property of test piece | |
|---|---|---|---|---|---|---|---|---|
| | HEMA | DMAA | SAMA | MPC | EDMA | | Water content (% by weight) | Oxygen permeability (Dk) |
| 3 | 53 | — | 47 | — | 0.5 | ○ | 84 | 45** |
| 4 | — | 50 | 50 | — | 0.5 | × | 91 | — |
| 5 | 85 | — | — | 15 | 0.5 | ○ | 68 | 18* |

*Measured value of test piece having thickness of 0.2 mm
**Measured value of test piece having thickness of 0.4 mm From the results shown in TABLE 1, it can be seen that the ocular lens materials (test pieces) of the present invention in EXAMPLES 1 to 7 are excellent in transparency and have high oxygen permeability without depending on water content and high refractive index. Also, the adhering protein amount and the adhering lipid amount of each ocular lens material are small, so it can be seen that the ocular lens materials in EXAMPLES 1 to 7 are excellent in deposit resistance.

To the contrary, the adhering protein amount and the adhering lipid amount of the test piece made of the polymer not having the zwitterionic group are large in COMPARATIVE EXAMPLE 2. So, it can be seen that the test piece in COMPARATIVE EXAMPLE 2 is poor in deposit resistance.

From the results shown in TABLE 2, it can be seen that the ocular lens material (test piece) of the present invention in EXAMPLE 8 is excellent in transparency and has high oxygen permeability and high refractive index. Also, the adhering lipid amount of the ocular lens material is small, so it can be seen that the ocular lens material in EXAMPLE 8 is excellent in deposit resistance. In addition, it can be seen that the ocular lens material in EXAMPLE 8 has small contact angle and is excellent in wettability to tears at the same time.

To the contrary, the adhering lipid amount of the test piece made of the polymer not having the zwitterionic group is large in COMPARATIVE EXAMPLE 6. So, it can be seen that the test piece in COMPARATIVE EXAMPLE 6 is poor in deposit resistance. In addition, it can be seen that the test piece in COMPARATIVE EXAMPLE 6 has large contact angle and is poor in wettability to tears at the same time.

The test pieces were produced by using the zwitterionic group-containing monomer as a monomer mixture in COMPARATIVE EXAMPLES 3 to 5. From the results shown in TABLE 3, it can be seen that the test piece in COMPARATIVE EXAMPLE 4 is poor in transparency, and that oxygen permeability of the test pieces in COMPARATIVE EXAMPLES 3 and 5 depends on water content.

From the above results, it can be seen that the ocular lens material (test piece) of the present invention in EXAMPLE 9 is excellent in transparency and has high oxygen permeability without depending on water content and high refractive index. Also, the adhering protein amount and the adhering lipid amount of the ocular lens material are small, so it can be seen that the ocular lens material in EXAMPLE 9 is excellent in deposit resistance.

In addition to the ingredients used in the Examples, other ingredients can be used in the Examples as set forth in the specification to obtain substantially the same results.

What is claimed is:

1. A process for producing an ocular lens material comprising a silicone compound, characterized by preparing a prepolymer of the silicone compound by copolymerizing a monomer mixture containing a monomer (A-1) having a group represented by the formula (IV):

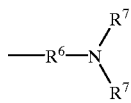 (IV)

wherein $R^6$ is an alkylene group having 1 to 20 carbon atoms, and $R^7$ is a linear or branched alkyl group having 1 to 10 carbon atoms and a silicon-containing monomer, and reacting the prepolymer of the silicone compound with a compound (B-1) which can react with the monomer (A-1) and impart —POO$^-$, —SOO$^-$ or —COO$^-$ to a silicone compound, to give the silicone compound having a zwitterionic group (I) represented by the formula (I):

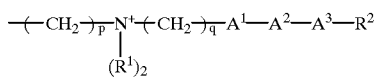 (I)

wherein $R^1$ is hydrogen atom or a linear or branched alkyl group having 1 to 10 carbon atoms, in which two groups represented by $R^1$ may be the same or different with each other, $R^2$ is a linear or branched aliphatic hydrocarbon group having 1 to 12 carbon atoms or an aromatic hydrocarbon group, $A^1$ is —O—, —S—, —NH— or direct bond, $A^2$ is

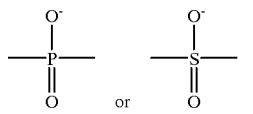

$A^3$ is —O—, —S—, —NH— or =O, in which when $A^2$ is —SOO—, $A^1$ and $A^3$ are not —S—, and when $A^3$ is =O, $R^2$ is absent, and each of p and q is independently an integer of 1 to 20; or a zwitterionic group (II) represented by the formula (II):

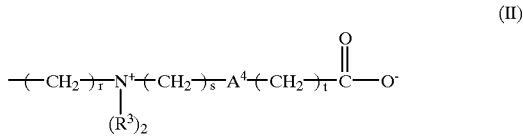 (II)

wherein $R^3$ is hydrogen atom or a linear or branched alkyl group having 1 to 10 carbon atoms, in which two groups represented by $R^3$ may be the same or different with each other, $A^4$ is —O—, —S—, —NH— or direct bond, and each of r, s and t is independently an integer of 1 to 20.

2. The process of claim 1, wherein a silicone compound having a zwitterionic group (I) is prepared by reacting the prepolymer of the silicone compound with a compound (B-1a) as the compound (B-1), represented by the formula (V):

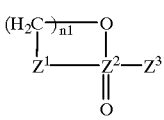 (V)

wherein $Z^1$ is —O—, —S—, —NH— or direct bond, $Z^2$ is P or S, $Z^3$ is a group represented by the formula: —O—$R^8$ in which $R^8$ is a linear or branched aliphatic hydrocarbon group having 1 to 12 carbon atoms or an aromatic hydrocarbon group, a group represented by the formula: —S—$R^8$ in which $R^8$ is the same as the above, a group represented by the formula: —NH—$R^8$ in which $R^8$ is the same as the above or =O, and n1 is an integer of 1 to 20; or a silicone compound having a zwitterionic group (II) is prepared by reacting the prepolymer of the silicone compound with a compound (B-1b) as the compound (B-1), represented by the formula (VI):

 (VI)

wherein $X^1$ is a halogen atom, M is an alkaline metal atom, $R^9$ is a group represented by the formula:

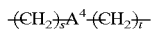

in which $A^4$ is —O—, —S—, —NH— or direct bond, and each of s and t is independently an integer of 1 to 20.

3. A transparent ocular lens material comprising a crosslinked silicone compound having at least one of a zwitterionic group (I) and a zwitterionic group (II), prepared by the process of claim 1, and being made using a crosslinkable monomer.

4. A process for producing an ocular lens material comprising a silicone compound, characterized by preparing a prepolymer of the silicone compound by copolymerizing a monomer mixture containing a hydroxyl group-containing monomer (A-2) and a silicon-containing monomer, preparing a prepolymer (B') by reacting the prepolymer of the silicone compound with a halogenated cyclic compound having phosphorus atom (B-2), and reacting the prepolymer (B') with a trialkylamine (C-1) represented by the formula (VII):

 (VII)

wherein $R^4$ is hydrogen atom or a linear or branched alkyl group having 1 to 10 carbon atoms, in which three groups represented by $R^4$ may be the same or different with each other, to give the silicone compound having a zwitterionic group (III) represented by the formula (III):

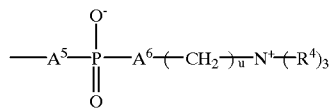
(III)

wherein $R^4$ is hydrogen atom or a linear or branched alkyl group having 1 to 10 carbon atoms, in which three groups represented by $R^4$ may be the same or different with each other, each of $A^5$ and $A^6$ is independently —O—, —S—, —NH— or direct bond, in which $A^5$ and $A^6$ are not direct bonds at the same time, and u is an integer of 1 to 20.

5. The process of claim 4, wherein the prepolymer (B') is prepared by reacting the prepolymer of the silicone compound with a compound (B-2a) as the halogenated cyclic compound (B-2), represented by the formula (VIII):

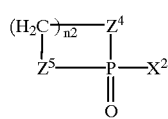
(VIII)

wherein each of $Z^4$ and $Z^5$ is independently —O—, —S—, —NH— or direct bond, in which $Z^4$ and $Z^5$ are not direct bonds at the same time, $X^2$ is a halogen atom, and n2 is an integer of 1 to 20.

6. A transparent ocular lens material comprising a crosslinked silicone compound having a zwitterionic group (III), prepared by the process of claim 4, and being made using a crosslinkable monomer.

7. A transparent ocular lens material comprising a crosslinked silicone compound having at least one of a zwitterionic group (I) and a zwitterionic group (II), wherein zwitterionic group (I) is represented by the formula (I):

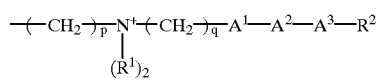
(I)

wherein $R^1$ is hydrogen atom or a linear or branched alkyl group having 1 to 10 carbon atoms, in which two groups represented by $R^1$ may be the same or different with each other, $R^2$ is a linear or branched aliphatic hydrocarbon group having 1 to 12 carbon atoms or an aromatic hydrocarbon group, $A^1$ is —O—, —S—, —NH— or direct bond, $A^2$ is

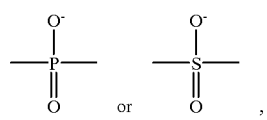

$A^3$ is —O—, —S—, —NH— or =O, in which when $A^2$ is —SOO—, $A^1$ and $A^3$ are not —S—, and when $A^3$ is =O, $R^2$ is absent, and each of p and q is independently an integer of 1 to 20;

and wherein zwitterionic group (II) is represented by the formula (II):

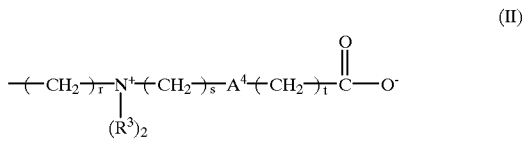
(II)

wherein $R^3$ is hydrogen atom or a linear or branched alkyl group having 1 to 10 carbon atoms, in which two groups represented by $R^3$ may be the same or different with each other, $A^4$ is —O—, —S—, —NH— or direct bond, and each of r, s and t is independently an integer of 1 to 20;

and produced by a process for producing a transparent ocular lens material, characterized by preparing a prepolymer of the crosslinked silicone compound by copolymerizing a monomer mixture containing a monomer (A-1), a silicon-containing monomer and a crosslinkable monomer, and reacting the prepolymer of the crosslinked silicone compound with a compound (B-1) which can react with the monomer (A-1) and impart —POO⁻, —SOO⁻ or —COO⁻ to the crosslinked silicone compound, to give the crosslinked silicone compound having at least one selected from the zwitterionic group (I) and the zwitterionic group (II).

8. The transparent ocular lens material of claim 7, wherein a crosslinked silicone compound having a zwitterionic group (I) is prepared by reacting the prepolymer of the crosslinked silicone compound with a compound (B-1a) as the compound (B-1), wherein compound (B-1a) is represented by the formula (V):

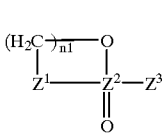
(V)

wherein $Z^1$ is —O—, —S—, —NH— or direct bond, $Z^2$ is P or S, $Z^3$ is a group represented by the formula: —O—$R^8$ in which $R^8$ is a linear or branched aliphatic hydrocarbon group having 1 to 12 carbon atoms or an aromatic hydrocarbon group, a group represented by the formula: —S—$R^8$ in which $R^1$ is the same as the above, a group represented by the formula: —NH—$R^8$ in which $R^8$ is the same as the above or =O, and n1 is an integer of 1 to 20;

or a crosslink(ed silicone compound having a zwitterionic group (II) is prepared by reacting the prepolymer of the crosslinked silicone compound with a compound (B-1b) as the compound (B-1), wherein compound (B-1b) is represented by the formula (VI):

$X^1$—$R^9$—COO—M (VI)

wherein $X^1$ is a halogen atom, M is an alkaline metal atom, $R^9$ is a group represented by the formula:

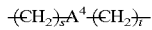

in which $A^4$ is —O—, —S—, —NH— or direct bond, and each of s and t is independently an integer of 1 to 20.

9. The transparent ocular lens material of claim 8, wherein the crosslinkable monomer is at least one selected from the group consisting of ethylene glycol di(meth)acrylate, diethylene glycol di(meth)acrylate, triethylene glycol di(meth)acrylate, propylene glycol di(meth)acrylate, dipropylene glycol di(meth)acrylate, allyl (meth)acrylate, vinyl (meth)acrylate, trimethylolpropane tri(meth)acrylate, methacryloyloxyethyl acrylate, divinylbenzene, diallyl phthalate, diallyl adipate, triallylisocyanurate, a-methylene-N-vinylpyrrolidone, 4-vinylbenzyl (meth)acrylate, 3-vinylbenzyl (meth)acrylate, 2,2-bis(p-(meth)acryloyloxyphenyl) hexafluoropropane, 2,2-bis(m-(meth)acryloyloxyphenyl)hexafluoropropane, 2,2-bis(o-(meth)acryloyloxyphenyl)hexafluoropropane, 2,2-bis(p-(meth)acryloyloxyphenyl)propane, 2,2-bis(m-(meth)acryloyloxyphenyl)propane, 2,2-bis(o-(meth)acryloyloxyphenyl)propane, 1,4-bis(2-(meth)acryloyloxyhexafluoroisopropyl)benzene, 1,3-bis(2-(meth)acryloyloxyhexafluoroisopropyl)benzene, 1,2-bis(2-(meth)acryloyloxyhexafluoroisopropyl)benzene, 1,4-bis(2-(meth)acryloyloxyisopropyl)benzene, 1,3-bis(2-(meth)acryloyloxyisopropyl)benzene and 1,2-bis(2-(meth)acryloyloxyisopropyl)benzene.

10. A transparent ocular lens material comprising a crosslinked silicone compound having a zwitterionic group (III), wherein zwitterionic group (III) is represented by the formula (III):

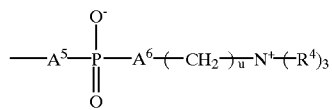

(III)

wherein $R^4$ is hydrogen atom or a linear or branched alkyl group having 1 to 10 carbon atoms, in which three groups represented by $R^4$ may be the same or different with each other, each of $A^1$ and $A^6$ is independently —O—, —S—, —NH— or direct bond, in which $A^5$ and $A^6$ are not direct bonds at the same time, and u is an integer of 1 to 20; and produced by a process for producing a transparent ocular lens material, characterized by preparing a prepolymer of the crosslinked silicone compound by copolymerizing a monomer mixture containing a hydroxyl group-containing monomer (A-2), a silicon-containing monomer and a crosslinkable monomer, preparing a prepolymer (B') by reacting the prepolymer of the crosslinked silicone compound with a halogenated cyclic compound having a phosphorus atom (B-2), and reacting the prepolymer (B') with a trialkylamine (C-1) to give the crosslinked silicone compound having the zwitterionic group (III).

11. A transparent ocular lens material of claim 10, wherein the prepolymer (B') is prepared by reacting the prepolymer of the crosslinked silicone compound with a compound (B-2a) of formula (VIII)

(VIII)

as the halogenated cyclic compound (B-2).

12. The transparent ocular lens material of claim 10, wherein the crosslinkable monomer is at least one selected from the group consisting of ethylene glycol di(meth)acrylate, diethylene glycol di(meth)acrylate, triethylene glycol di(meth)acrylate, propylene glycol di(meth)acrylate, dipropylene glycol di(meth)acrylate, allyl (meth)acrylate, vinyl (meth)acrylate, trimethylolpropane tri(meth)acrylate, methacryloyloxyethyl acrylate, divinylbenzene, diallyl phthalate, diallyl adipate, triallylisocyanurate, α-methylene-N-vinylpyrrolidone, 4-vinylbenzyl (meth)acrylate, 3-vinylbenzyl (meth)acrylate, 2,2-bis(p-(meth)acryloyloxyphenyl) hexafluoropropane, 2,2-bis(m-(meth)acryloyloxyphenyl)hexafluoropropane, 2,2-bis(o-(meth)acryloyloxyphenyl)hexafluoropropane, 2,2-bis(p-(meth)acryloyloxyphenyl)propane, 2,2-bis(m-(meth)acryloyloxyphenyl)propane, 2,2-bis(o-(meth)acryloyloxyphenyl)propane, 1,4-bis(2-(meth)acryloyloxy hexafluoroisopropyl)benzene, 1-,3-bis(2-(meth)acryloyloxyhexafluoroisopropyl)benzene, 1,2-bis(2-(meth)acryloyloxyhexafluoroisopropyl)benzene, 1,4-bis(2-(meth)acryloyloxyisopropyl)benzene, 1,3-bis(2-(meth)acryloyloxyisopropyl)benzene and 1,2-bis(2-(meth)acryloyloxyisopropyl) benzene.

* * * * *